United States Patent [19]

Ishihara et al.

[11] Patent Number: 5,053,642

[45] Date of Patent: Oct. 1, 1991

[54] BUS CIRCUIT AND OPERATING METHOD THEREOF

[75] Inventors: Kazuya Ishihara; Hiroshi Segawa; Chikako Ikenaga; Yoshitsugu Inoue; Atsushi Kurimoto; Harufusa Kondo; Takeo Nakabayashi, all of Hyogo, Japan

[73] Assignee: Mitsubishi Denki Kabushiki Kaisha, Tokyo, Japan

[21] Appl. No.: 508,724

[22] Filed: Apr. 13, 1990

[30] Foreign Application Priority Data

Apr. 18, 1989 [JP] Japan .................................. 1-99306
Mar. 26, 1990 [JP] Japan .................................. 2-78283

[51] Int. Cl.$^5$ ...................... H03K 19/17; H03K 17/16
[52] U.S. Cl. ...................................... 307/443; 307/465
[58] Field of Search ..................... 307/443, 465, 473; 364/240.2, 240.5

[56] References Cited

U.S. PATENT DOCUMENTS

| | | |
|---|---|---|
| 4,857,765 | 8/1989 | Cahill et al. ........................ 307/443 |
| 4,872,161 | 10/1989 | Ichinohe ............................ 307/443 |
| 4,882,507 | 11/1989 | Tatsumi et al. ..................... 307/443 |
| 4,883,989 | 11/1989 | Mizukami .......................... 307/443 |
| 4,893,033 | 1/1990 | Itano et al. ........................ 307/443 |
| 4,918,329 | 4/1990 | Milby et al. ....................... 307/443 |

FOREIGN PATENT DOCUMENTS 62-201862 12/1987 Japan .

OTHER PUBLICATIONS

Mukherjee, A., *Introduction to NMOS and CMOS VLSI Systems Design*, pp. 94–95.

Primary Examiner—David Hudspeth
Assistant Examiner—Andrew Sanders
Attorney, Agent, or Firm—Lowe, Price, LeBlanc and Becker

[57] ABSTRACT

A bus circuit comprises a bus interconnection (1) and a plurality of local bus interconnections (10). A plurality of circuit blocks (21a to 21d) are connected to each of the plurality of local bus interconnections (10). A multiplexer (70), a bus driver (60) and a transmitting circuit (80A) are provided corresponding to each of the local bus interconnections (10). Each multiplexer (70) selects one of the outputs from the corresponding plurality of circuit blocks (21a to 21d) and applies the selected one to the bus driver (60). The bus driver (60) drives the bus interconnection (1) according to the output of the multiplexer (70). The local bus interconnections (10) are precharged to a predetermined potential in advance. When any of the plurality of transmitting circuits (80A) is selected, the selected transmitting circuit (80A) either discharges the corresponding local bus interconnection (10) or holds the same at a predetermined potential according to the information on the bus interconnection (1).

43 Claims, 16 Drawing Sheets

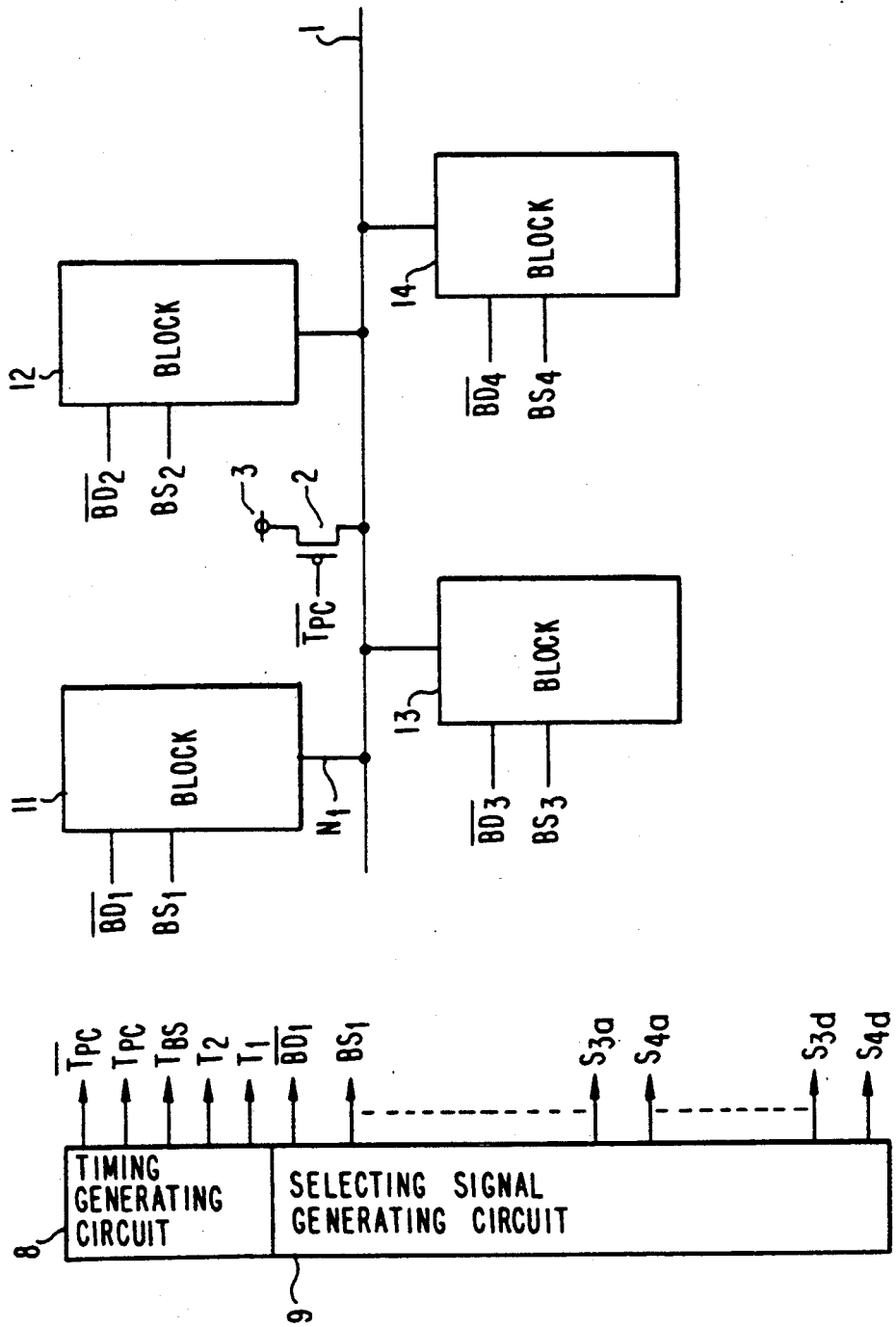

BUS CIRCUIT AND OPERATING METHOD THEREOF

BACKGROUND OF THE INVENTION

1. Field of the Invention

The present invention relates to bus circuits and operating methods thereof, and more particularly, to a bus circuit for transmitting information to one another between a plurality of functional portions, and operating methods thereof.

2. Description of the Background Art

FIG. 13 shows a conventional precharge-type bus circuit. This type of bus circuit is used, for example, in semiconductor integrated circuit devices such as microcomputers. In FIG. 13, a bus interconnection 1 is connected to a power supply terminal 3 through a precharging P-channel MOS transistor 2. The transistor 2 has a source connected to the power supply terminal 3, a drain connected to the bus interconnection 1, and a gate receiving a precharging signal $\overline{T_{PC}}$. A plurality of circuit blocks 11a to 11d are connected to the bus interconnection 1. Each of the circuit blocks 11a to 11d comprises latch circuits 4 and 5, a logic circuit 6 and a bus driver 7. Information from the bus interconnection 1 is inputted to the latch circuit 4. Output of the latch circuit 4 is applied to the logic circuit 6, output of which is applied to the latch circuit 5. Information outputted from the latch circuit 5 is applied to the bus interconnection 1 through the bus driver 7. Each of the circuit blocks 11a to 11d functions as a source (transmitting portion) and a destination (receiving portion).

In FIG. 14, there is mainly shown a detailed circuit structure of the circuit block 11a. The latch circuit 4 comprises inverters 41, 42 and 43, a NAND gate 44 and N-channel MOS transistors 45 and 46. One input terminal of the NAND gate 44 receives a control signal T1 and the other receives a selecting signal S1a. When the selecting signal S1a is at the "H" level, the circuit block 11a is selected as a destination. When the control signal T1 attains the "H" level, the transistor 45 is turned on so that information on the bus interconnection 1 is inputted to the input terminal of the inverter 41. When the control signal T1 falls down to the "L" level, the transistor 46 is turned on so that the information is latched in the latch portion comprising the inverters 41 and 42, and the transistor 46.

Output of the latch circuit 4 is inputted to the logic circuit 6, a portion for performing processings such as logic operation. Output of the logic circuit 6 is inputted to the latch circuit 5.

The latch circuit 5 comprises inverters 51, 52 and 53 and N-channel MOS transistors 54 and 55. The gate of the transistor 54 receives a control signal T2. The control signal T2 is also applied to the gate of the transistor 55 through the inverter 53. When the control signal T2 attains the "H" level, the transistor 54 is turned on so that the information from the logic circuit 6 is applied to the input terminal of the inverter 51. When the control signal T2 falls down to the "L" level, the transistor 55 is turned on so that the information is latched in a latch portion comprising the inverters 51 and 52 and the transistor 55.

The bus driver 7 comprises an AND gate 71 and N-channel MOS transistors 72 and 73. The gate of the transistor 73 receives output from the latch circuit 5. One input terminal of the NAND gate 71 receives a control and the other receives a selecting signal S2a. When the selecting signal S2a is at the "H" level, the circuit block 11a is selected as a source. When the control signal $T_{BS}$ attains the "H" level, an inverted signal of output from the latch circuit 5 is applied to the bus interconnection 1.

The other circuit blocks 11b to 11d are configured in the same way as the circuit block 11a. The circuit blocks 11b to 11d receive, however, selecting signals S1b and S2b to S1d and S2d, respectively, instead of the selecting signals S1a and S2a.

A description will be now made on operation of the bus circuit shown in FIGS. 13 and 14 with reference to a timing chart of FIG. 15. A case in which data latched in the latch circuit 5 of the circuit block 11a should be transferred to the latch circuit 4 of the circuit block 11d will be here taken as an example. This means that the circuit block 11a is a source and the circuit block 11d is a destination in this case.

In FIG. 15, the time duration from t0 to t4 constitutes a single transfer cycle. Initially, the control signal $\overline{T_{BS}}$ falls to the "L" level and then the precharge signal $\overline{T_{PC}}$ falls to the "L" level, which turns the transistor 2 on so that current flows from the power supply terminal 3 to the bus interconnection 1, raising potential on the bus interconnection to the "H" level. At this moment, the selecting signals S1a to S1d and S2a to S2d are at the "L" level. The control signal T2 attains in turn the "H" level at the time of t1. This permits the latch circuit 5 to accept output from the logic circuit 6. Subsequently, the selecting signals S2a and S1d attain the "H" level, which allows selection of the circuit block 11a as a source and the circuit block 11d as a destination.

At the time t2, the precharge signal $\overline{T_{PC}}$ attains the "H" level, turning the transistor 2 off. As a result, the bus interconnection 1 is held at the "H" level. At this moment, the control signal T2 falls to the "L" level, which causes the data having been applied to the latch circuit 5 to be held therein and then outputted. When the control signal $T_{BS}$ rises to the "H" level, the bus driver 7 in the circuit block 11a is activated. If the data outputted from the latch circuit 5 is at the "H" level, the potential on the bus interconnection 1 slowly returns to the "L" level. Conversely, if the data outputted from the latch circuit 5 is at the "L" level, the potential on the bus interconnection 1 remains held at the "H" level. In other words, inverted ones of the data latched in the latch circuit 5 are applied to the bus interconnection 1.

At the time of t3, the control signal T1 rises to the "H" level, which permits the latch circuit 4 in the circuit block 11d to accept the data on the bus interconnection 1. When the control signal T1 falls to the "L" level at the time t4, the data having been applied to the latch circuit 4 is latched therein and then outputted.

As described in the foregoing, data outputted from the logic circuit of the circuit block 11a are transmitted to the logic circuit 6 of the circuit block 11d.

In conventional precharge-type bus circuits, any increased number of circuit blocks to be selected as source and destination of a bus has required a longer interconnection and larger capacitance for the bus, and also an increased number of bus drivers. Consequently, there have been problems such as too much time to be taken in charging and discharging the bus interconnection.

SUMMARY OF THE INVENTION

An object of the present invention is to shorten information transmitting time in a bus circuit.

Another object of the present invention is to reduce consumption power in a bus circuit.

Still another object of the present invention is to provide a bus circuit which can transmit information at a higher speed with a shortened charging and discharging time for a bus interconnection.

A further object of the present invention is to provide a bus circuit having a reduced number of bus drivers.

A further object of the present invention is to provide an operating method of a bus circuit which can shorten information transmitting time and also reduce consumption power.

A bus circuit formed on one chip according to the present invention is provided with hierarchical buses and a plurality of transmitting circuits. The hierarchical buses comprise a higher-rank bus and a plurality of lower-rank buses. The plurality of lower-rank buses are each coupled with a plurality of functional portions Each transmitting means transmits information between the higher-rank bus and one of the plurality of lower-rank buses.

In the bus circuit above, the buses are hierarchically configured and the number of bus drivers can be reduced. In addition, unselected lower-rank buses are disconnected from the higher-rank bus. This results in a reduced bus capacitance and a shortened time for charging and discharging the bus, thereby reducing the consumption power as well.

According to another aspect of the present invention, the bus circuit formed on one chip further comprises a precharging circuit. The precharging circuit precharges at least the higher-rank bus or one of the plurality of lower-rank buses to a predetermined potential.

According to still another aspect of the present invention, the bus circuit formed on one chip further comprises a level shifting circuit. The level shifting circuit shifts the potential to be precharged by the precharging circuit by a predetermined voltage so that the precharge level is made lower than the predetermined potential. Accordingly, the power consumed in precharging the bus is reduced.

According to still another aspect of the present invention, a bus circuit formed on chip comprises hierarchical buses, a precharging circuit, a plurality of tre-state driving circuits, and a plurality of drivers. The precharging circuit precharges a higher-rank bus to a predetermined potential. The plurality of tri-state driving circuits drives each lower-rank bus to any of a first predetermined potential, a second predetermined potential and the floating state, according to information from the higher-rank bus. The plurality of drivers are provided corresponding to a plurality of lower-rank buses to drive the higher-rank bus, each according to output of any of a plurality of corresponding functional portions.

The bus circuit comprises a precharge-type higher rank bus and a plurality of tri-state type lower-rank buses. Since every one of the plurality of lower-rank buses does not require a precharging circuit, the circuit structure and interconnection can be simplified, providing an advantageous layout.

According to another aspect of the present invention, a bus circuit formed on one chip comprises hierarchical buses, a plurality of ultiplexers, a plurality of drivers and a plurality of transmitting circuits. The plurality of multiplexers are provided corresponding to a plurality of lower-rank buses, each selecting output of any of a plurality of corresponding functional portions. The plurality of drivers are provided corresponding to the plurality of lower-rank buses to drive the higher-rank bus, each according to output of a functional portion selected by the corresponding multiplexer. The plurality of transmitting circuits are provided corresponding to the plurality of lower-rank buses to drive the corresponding lower-rank buses, each according to information from the higher-rank bus.

In the bus circuit above, each lower-rank bus is provided with a multiplexer so that the plurality of functional portions connected to each lower-rank bus holds single driver in common. Accordingly, the number of drivers can be reduced. This results in a further reduced bus capacitance and a further shortened time for transmitting information, thereby further reducing the consumption power as well.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1A is a diagram showing the entire structure of a bus circuit according to an embodiment of the present invention.

DESCRIPTION OF THE PREFERRED EMBODIMENTS

In the following, a detailed description will be made on embodiments of the present invention with reference to the accompanying drawings.

Figure 1B:
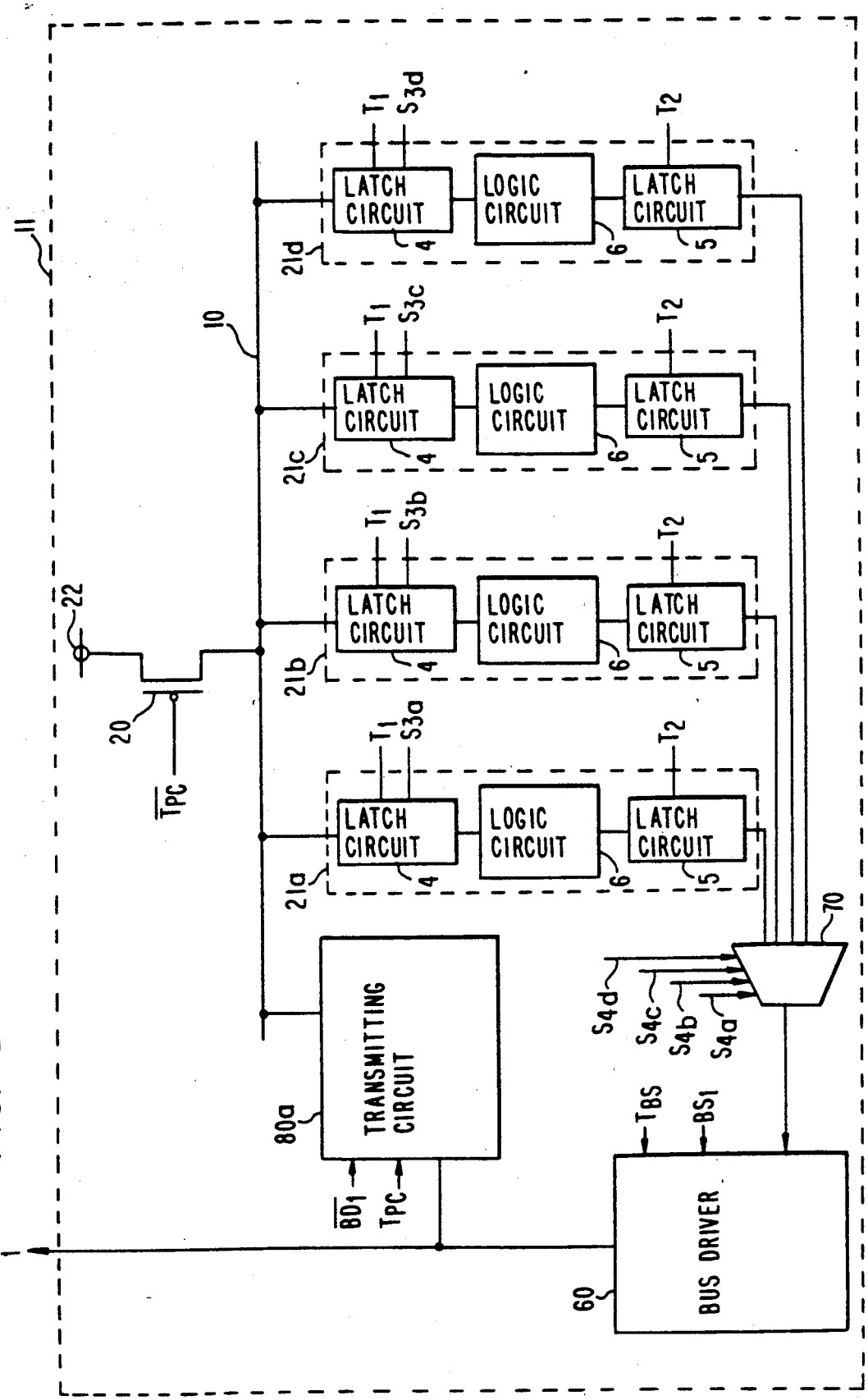
FIG. 1B is a diagram showing structure of one block contained in the bus circuit shown in FIG. 1A.

FIG. 1A shows the entire structure of a precharge-type bus circuit according to a first embodiment of the present invention. FIG. 1B shows structure of one block included in FIG. 1A.

As shown in FIG. 1A, a plurality of blocks 11 to 14 are connected to a bus interconnection 1 serving as a higher-rank bus. Each of the plurality of blocks 11 to 14 is provided, as shown in FIG. 1B, with a local bus interconnection 10 serving as a lower-rank bus interconnection bus. The bus interconnection 1 is connected to a power supply terminal 3 through a precharging P-channel MOS transistor 2. The gate of the transistor 2 receives a precharging signal $\overline{T_{PC}}$. A timing generating circuit 8 generates control signals T1, T2, and $T_{BS}$, and precharging signals $T_{PC}$ and $\overline{T_{PC}}$. A selecting signal generating circuit 9 generates selecting signals S3a to S3d and S4a to S4d, and block selecting signals $\overline{BD1}$ to $\overline{BD4}$ and BS1 to BS4, The blocks 11 to 14 receive the block selecting signals $\overline{BD1}$ to $\overline{BD4}$, respectively. The selecting signals $\overline{BD1}$ to $\overline{BD1}$ are signals for selecting a block as destination. In addition, the blocks 11 to 14 receive block selecting signals BS1 to BS4, respectively. The block the selecting signals BS1 to BS4 are signals for selecting a block as source.

In FIG. 1B, the local bus interconnection 10 is connected to a power supply terminal 22 through a precharging P-channel MOS transistor 20. The gate of the transistor 20 receives the precharging signal $\overline{T_{PC}}$. A plurality of circuit blocks 21a to 21d are connected to the local bus interconnection 10.

Each of the circuit blocks 21a to 21d comprises latch circuits 4 and 5, and a logic circuit 6. The input terminal of the latch circuit 4 is connected to the local bus interconnection 10. Output of the latch circuit 4 is applied to the logic circuit 6, output of which is applied to the latch circuit 5. Output of the latch circuit 5 is applied to a multiplexer 70. Each latch circuit 4 receives the control signal T1 and each latch circuit 5 receives the control signal T2.

The latch circuits 4 of the circuit blocks 21a to 21d receive the selecting signals S3a to S3d, respectively. According to these selecting signals S3a to S3d, a circuit block is selected as destination.

The multiplexer 70 receives the selecting signals S4a to S4d. According to the selecting signals S4a to S4d, output from any one of the circuit blocks 21a to 21d is selected and outputted from the multiplex 70. That is, a circuit block is selected as source according to the selecting signals S4a to S4d.

The output of the multiplexer 70 is applied to a bus driver 60. The bus driver 60 is activated by the control signal $T_{BS}$ and the bus selecting signal BS1. When any one of the circuit blocks 21a to 21d in the block 11 is selected as source, the bus driver 60 drives the bus interconnection 1 according to the output of the multiplexer 70.

Meanwhile, the bus interconnection 1 is connected to a transmitting circuit 80a. The transmitting circuit 80 is activated in response to the control signal $T_{PC}$ and the bus selecting signal $\overline{BD1}$. When any of the circuit blocks 21a to 21d in the block 11 is selected as destination, the transmitting circuit 80a transmits data on the bus interconnection 1 to the local bus interconnection 10.

Figure 2:
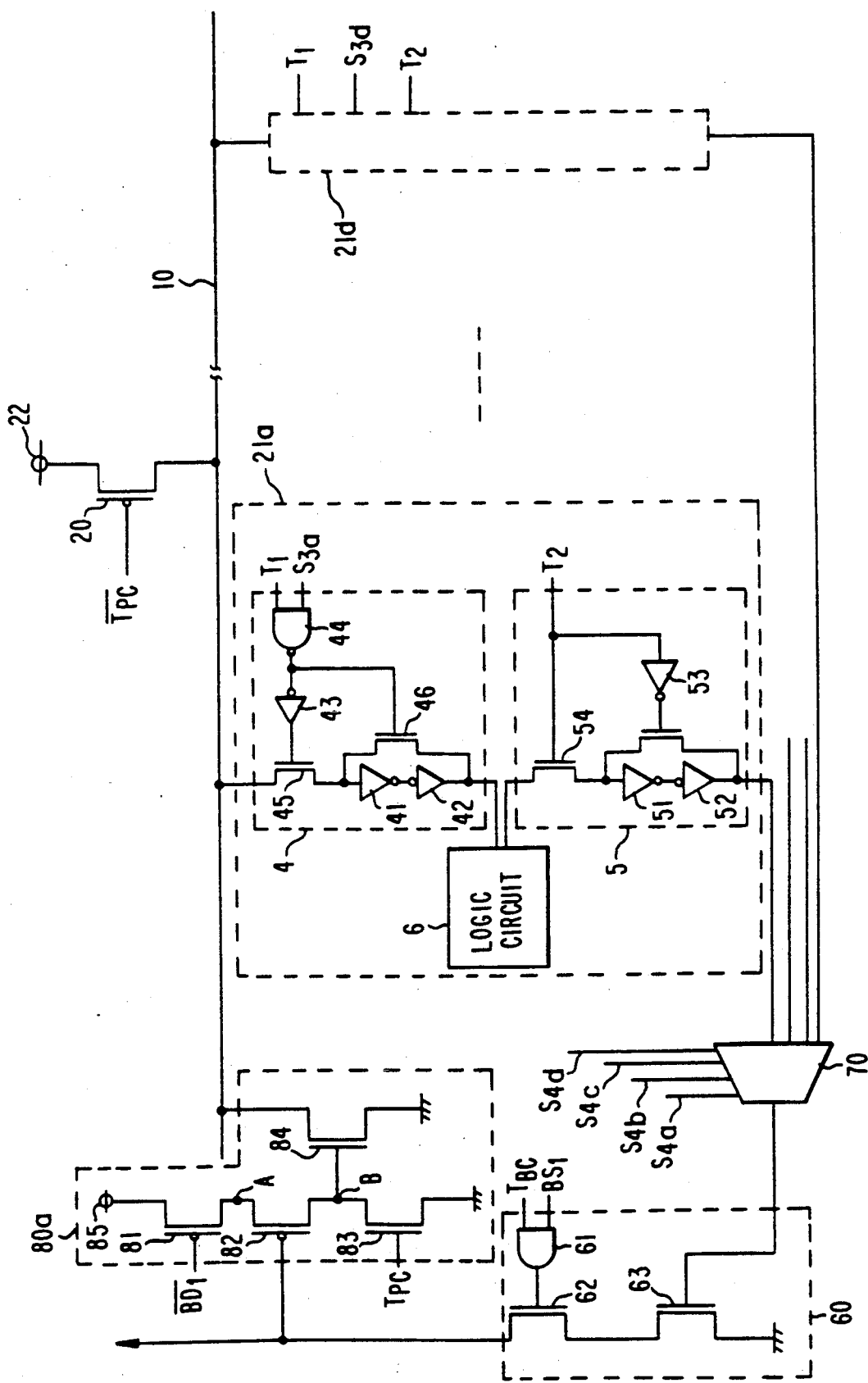
FIG. 2 is a circuit diagram showing a detailed structure of the main part of FIG. 1B.

In FIG. 2, there is shown a detailed circuit diagram of the circuit block 21a, the bus driver 60 and the transmitting circuit 80a.

Figure 14:
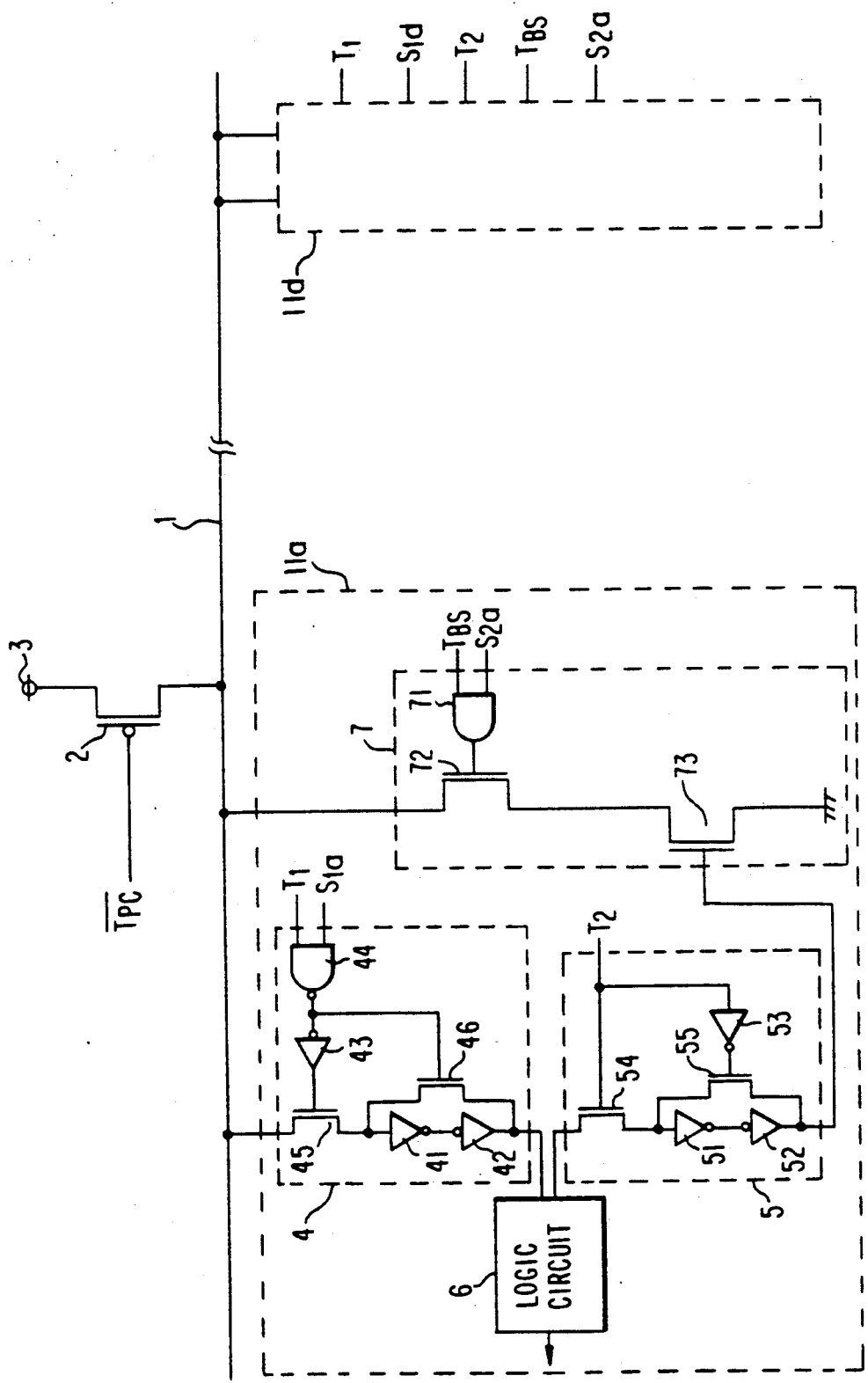
FIG. 14 is a circuit diagram showing structure of one circuit block contained in the bus circuit shown in FIG. 13.
Figure 15:
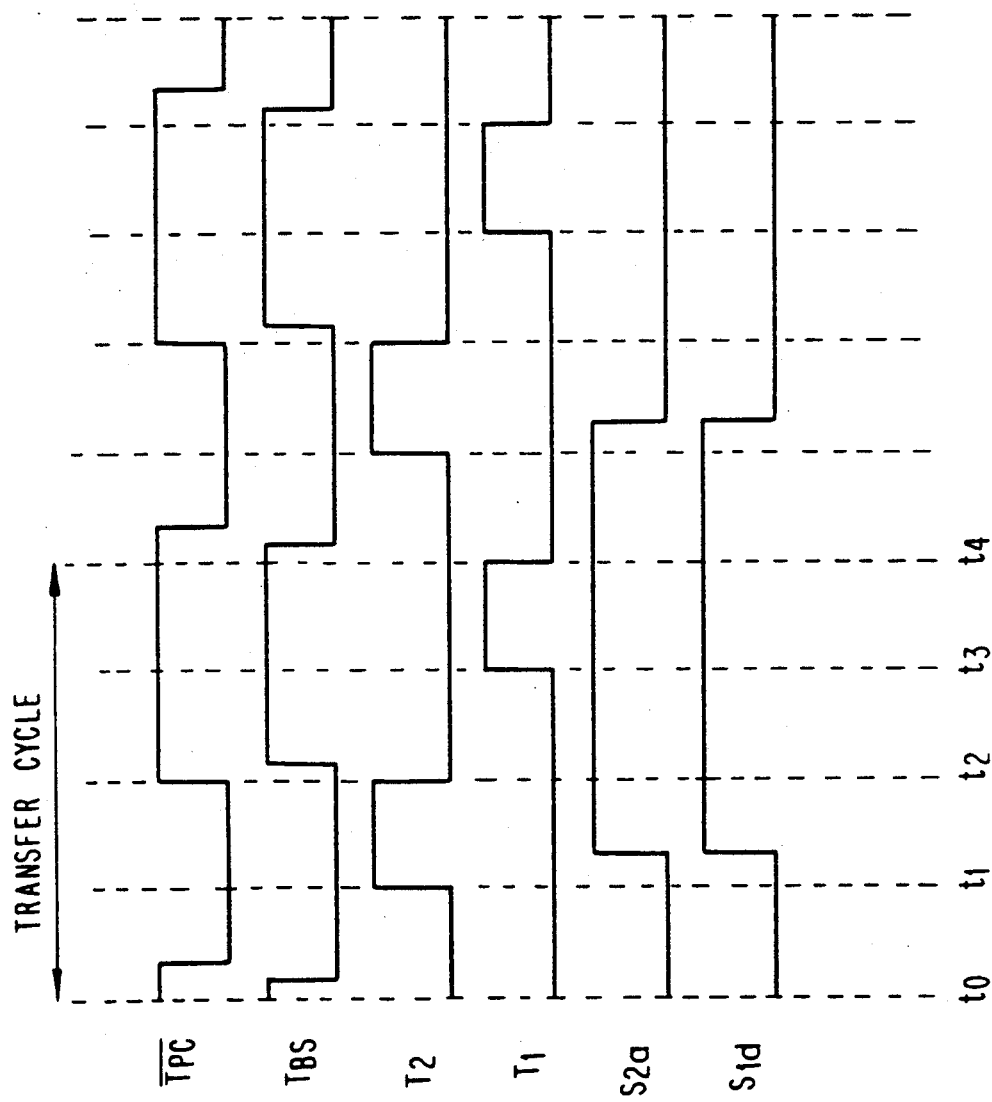
FIG. 15 is a timing chart for explaining operation of a conventional bus circuit.

The latch circuits 4 and 5 in the circuit block 21a are configured in the same manner as the latch circuits 4 and 5 included in the circuit block 11a shown in FIG. 14. In FIG. 2, however, one input terminal of the NAND gate 44 of the latch circuit 4 receives the selecting signal S3a.

The bus driver 60 comprises an AND gate 61 and N-channel MOS transistors 62 and 63 connected in series. One input terminal of the AND gate 61 receives the control signal $T_{BS}$ and the other receives the block selecting signal BS1. Output of the AND gate 61 is applied to the gate of the transistor 62. The gate of the transistor 63 receives output from the multiplexer 70. The drain of the transistor 62 is connected to the bus interconnection 1, while the source of the transistor 63 is connected to a ground terminal.

The transmitting circuit 80a comprises P-channel MOS transistors 81 and 82, and N-channel MOS transistors 83 and 84. The transistor 81 has the source connected to a power supply terminal 85 and the drain connected to the source of the transistor 82, and the gate receiving the block selecting signal $\overline{BD1}$. The transistor 82 has the gate connected to the bus interconnection 1 and the drain connected to the drain of the transistor 83 and the gate of the transistor 84. The gate of transistor 83 receives the precharging signal $T_{PC}$. The sources of the transistor 83 and the transistor 84 are both connected to ground terminals. The drain of the transistor 84 is connected to the local bus interconnection 10. The transistor 84 is one for discharging the local bus interconnection 10.

Meanwhile, the circuit blocks 21b to 21d shown in FIG. 1B are configured in the same manner as the circuit block 21a shown in FIG. 2.

In the following, operation of the bus circuit shown in FIGS. 1A, 1B and 2 will be described with reference to the timing chart in FIG. 3. A case will now be taken as an example and described where data in the latch circuit 5 of the circuit block 21a in the block 11 should be transmitted to the latch circuit 4 in the circuit block 21d of the block 14. In other words, the circuit block 21a in the block 11 is a source and the circuit block 21d in the block 14 is a destination.

Figure 3:
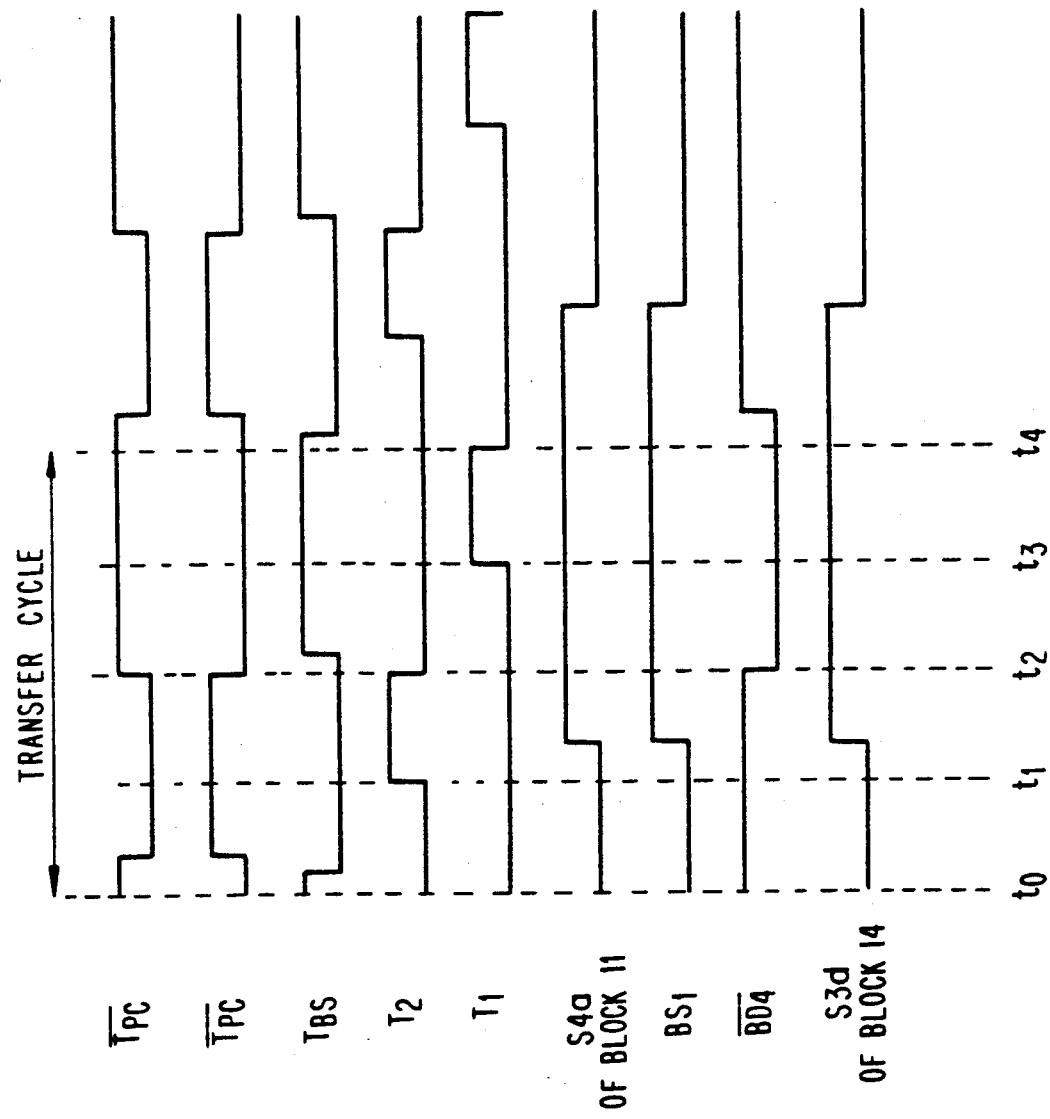
FIG. 3 is a timing chart for explaining operation of the embodiment.

In FIG. 3, a time duration from time t0 to time t4 constitutes a single transfer circle. Initially, the control signal $\overline{T_{BS}}$ falls to the "L" level. Sequentially, the precharging signal $T_{PC}$ falls to the "L" level and the precharging signal $\overline{T_{PC}}$ attains the "H" level, which turns the transistor 2 in FIG. 1A and the transistor 20 in FIG. 1B on. As a result, current flows from the power supply terminal 3 to the bus interconnection 1, and at the same time, from the power supply terminal 22 to the local bus interconnections 10 in each block, so that potentials of the bus interconnection 1 and the local bus interconnections 10 attain the "H" level. In addition, the transistors 83 of the transmitting circuits 80a in the blocks 11 to 14 are turned on, so that potential of the gate of the transistor 84 falls to the "L" level. At this moment, the selecting signals S3a to S3d and S4a to S4d, and the block selecting signals BS1 to BS4 are all at the "L" level, while the block selecting signals $\overline{BD1}$ to $\overline{BD4}$ are all at the "H" level.

At the time of t1, the control signal T2 rises to the "H" level, which permits data outputted from the logic circuit 6 to be inputted to the latch circuit 5. Then, the block selecting signal BS1 rises to the "H" level so that the block 11 in FIG. 1A is selected as source. At the same time, the selecting signal S4a applied to the multiplex 70 in the block 11 attains the "H" level so that the circuit block 21a in the block 11 is selected as source. Also at the same time, the selecting signal S3d applied the circuit block 21d in the block 14 attains the "H" level so that the circuit block 21d in the block 14 is selected as destination.

At the time of t2, the precharging signal $\overline{T_{PC}}$ attains the "H" level and the precharging signal $T_{PC}$ falls to the "L" level so that the transistor 2 in FIG. 1A and the transistor 20 in FIG. 1B are turned off. The bus interconnection 1 and the local bus interconnection 10 in each block remain, however, held at the "H" level, while the transistor 83 in the transmitting circuit 80a is turned off.

The control circuit T2 also falls to the "L" level so that the data from the logic circuit 6 are latched in the latch circuit 5 and then outputted. As a result, only the data outputted from the circuit block 21a in the block 11 are applied to the bus driver 60 through the multiplexer 70. Further, the block selecting signal $\overline{BD4}$ falls to the "L" level at the time of t2 again so that the transistor 81 of the transmitting circuit 80a in the block 14 is turned on.

Thereafter, the control signal $T_{BS}$ attains the "H" level so that the transistor 62 of the bus driver 60 in the block 11 is turned on. If the data outputted from the multiplexer 70 is at the "H" level, the transistor 63 is turned on so that the bus driver 60 causes potential of the bus interconnection 1 to be discharged to the "L" level. Conversely, if the data outputted from the multiplexer 70 is at the "L" level, the transistor 63 is in the off-state so that potential of the bus interconnection 1 is held at the "H" level.

At this moment, since the block selecting signals BS2 to BS4 applied to the bus drivers 60 in other blocks 12 to 14 are at the "L" level, the bus drivers 60 in those blocks 12 to 14 that have not been selected as source are not activated.

Meanwhile, the transistor 81 of the transmitting circuit 80a in the block 14 is in the on-state. If the data on the bus interconnection 1 is at the "H" level, the transistor 82 is in the off-state so that potential of the gate of transistor 84 is held at the "L" level and thus the transistor 84 remains in the off-state. As a result, potential of the local bus interconnection 10 is held at the "H" level. Conversely, if the data on the bus interconnection 1 is at the "L" level, the transistor 82 is turned on so that a potential of "H" level is applied to the gate of the transistor 84 and thus the transistor 84 is turned on. As a result, potential of the local bus interconnection 10 is discharged to the "L" level. At this moment, the block selecting signals $\overline{BD1}$ to $\overline{BD3}$ applied to the transmitting circuits 80a in the other blocks 11 to 13 are at the "H" level so that the local bus interconnections 10 of those blocks 11 to 13 that have not been selected as destination are not discharged.

Subsequently, the control signal T1 attains the "H" level at the time of t3. This permits the data on the local bus interconnection 10 to be inputted to the latch circuit 4 of the circuit block 21d in the block 14. When the control signal T1 falls to the "L" level at the time of t , the data inputted to the latch circuit 4 is latched and then outputted to the logic circuit 6.

As described in the above, data outputted from the logic circuit 6 of the circuit block 21a in the block 11 are transmitted to the logic circuit 6 of the circuit block 21d in the block 14 through the bus interconnection 1 and the bus interconnection 10 in the block 14.

In this bus circuit, only the bus driver in the block selected as source is activated and other bus drivers in those blocks that have not been selected as source are not activated. Further, when the data on the bus interconnection 1 is at the "L" level, only the local bus interconnection in the block selected as destination only is discharged and other local bus interconnections in those blocks that have not been selected as destination are not discharged. As a result, consumption power is reduced.

Furthermore, a single bus driver is provided in common for a plurality of circuit blocks in each block. In addition, the local bus interconnections in those blocks that have not been selected as destination are disconnected from the bus interconnection. Therefore, the bus capacitance is reduced and the charging time for the bu interconnection is also shortened.

Figure 4:
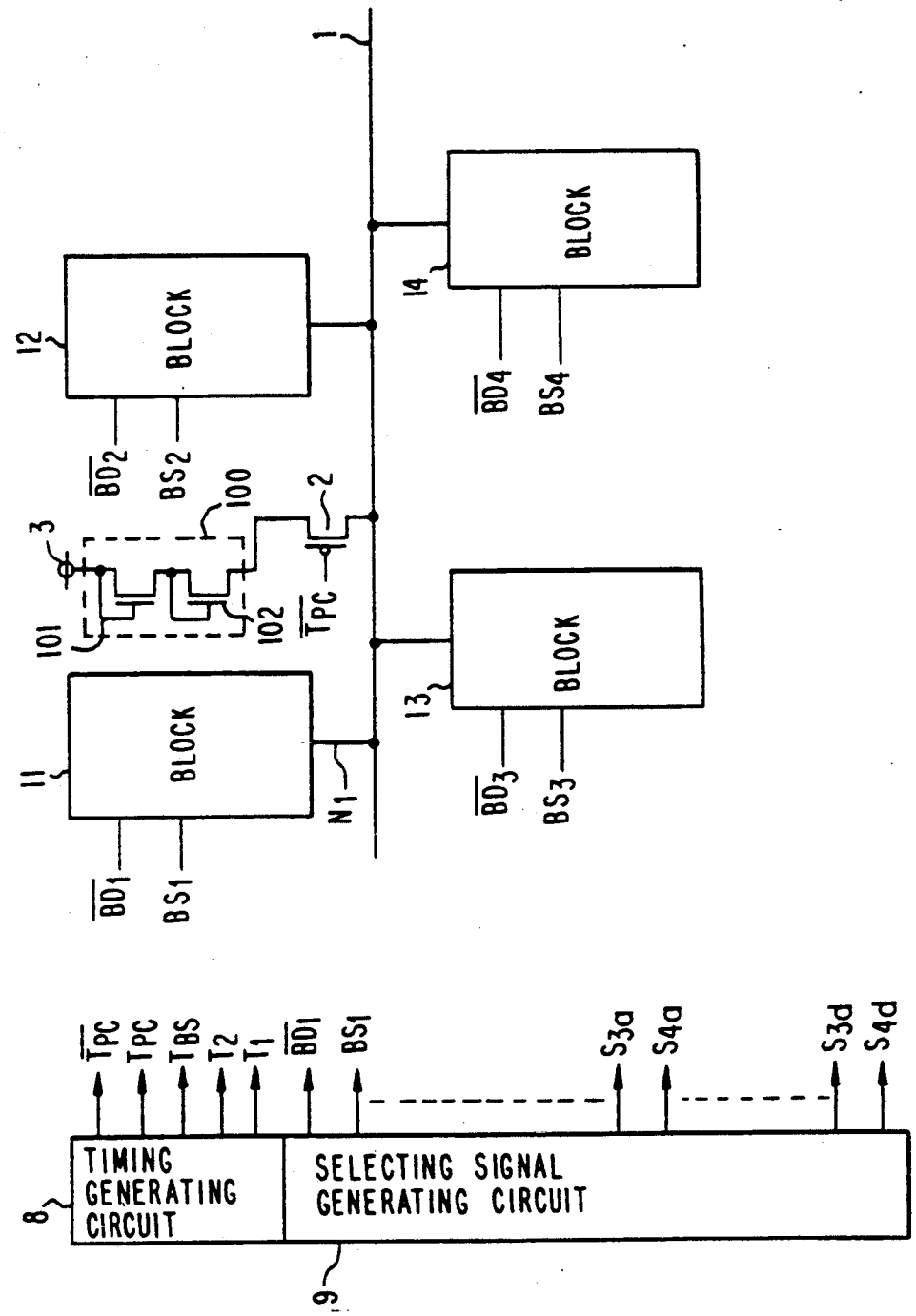
FIG. 4 is a diagram showing the entire structure of a bus circuit according to a second embodiment of the present invention.
Figure 5:
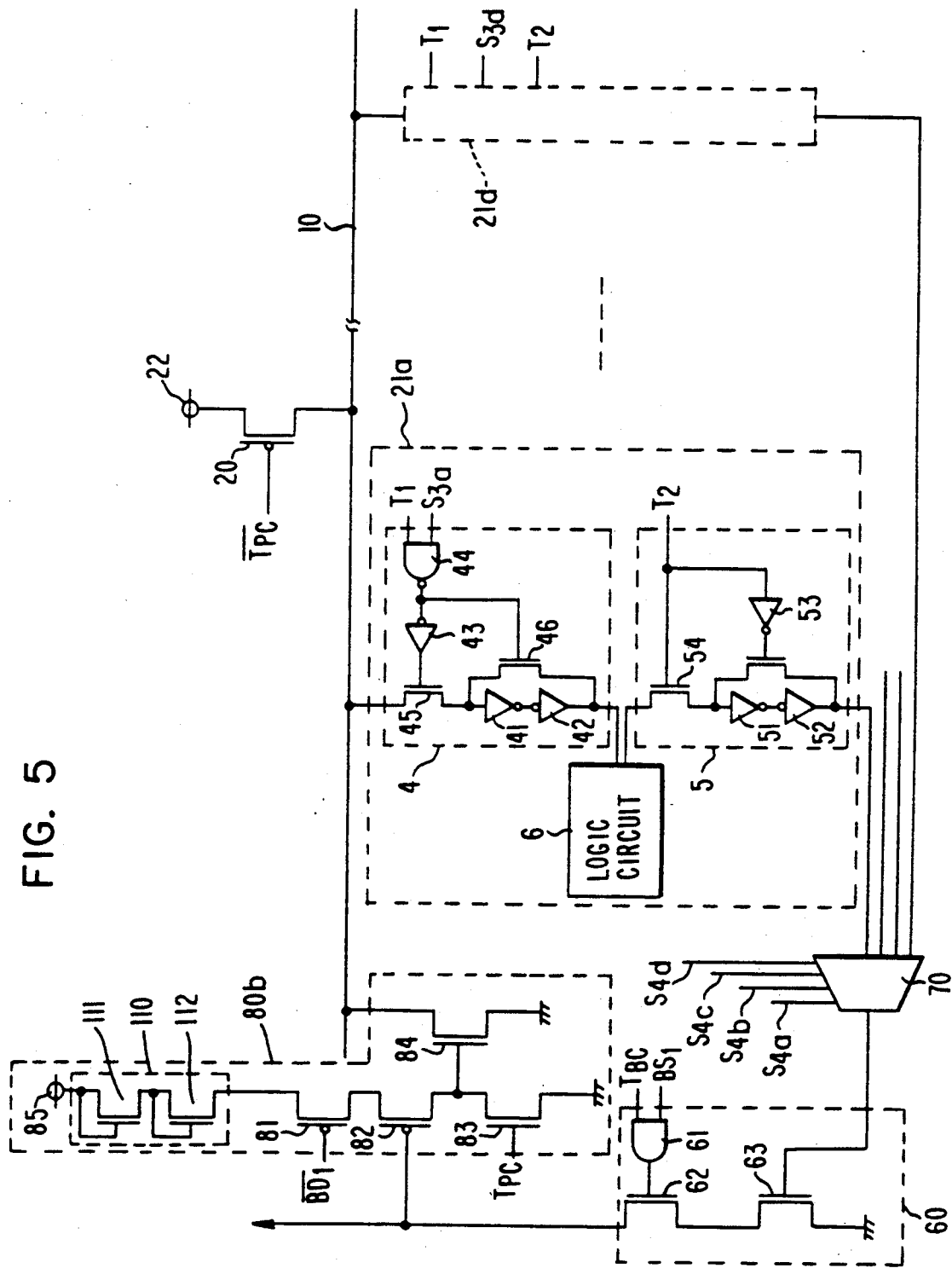
FIG. 5 is a circuit diagram showing a detailed structure of the main part of FIG. 4.

FIG. 4 is a diagram showing the entire structure of a precharge-type bus circuit according to a second embodiment of the present invention. FIG. 5 is a circuit diagram showing a detailed structure of one block contained in the bus circuit shown FIG. 4

In FIG. 4, a level shifting circuit 100 is connected between a power supply terminal 3 and a precharging transistor 2. The level shifting circuit 100 comprises two diode-connected N-channel MOS transistors 101 and 102.

Also in a transmitting circuit 80b of FIG. 5, a level shifting circuit 110 is connected between a power supply terminal 85 and the source of a transistor 81. The level shifting circuit 110 comprises two diode-connected N-channel MOS transistors 111 and 112.

Assuming now that the threshold voltage of the transistors 101 and 102 in the level shifting circuit 100 of FIG. 4, and of the transistors 111 and 112 in the level shifting circuit 110 of FIG. 5 is Vth, and the power supply level of the power supply terminals 3 and 85 is Vcc, the precharge level of the bus interconnection 1 is represented by Vcc-2Vth, and the level of drain potential of the transistor 81 in the transmitting circuit 80b is also represented by the same expression, Vcc-2Vth. The transmitting circuit 80b detects potential drop of the bus interconnection 1 with Vcc-2Vth as a reference.

In this manner, according to the second embodiment, the precharge level of the bus interconnection 1 is held lower than the power supply level, so that the consumption power is reduced.

Meanwhile, structure and operation of other portions are the same as those in the first embodiment.

Figure 6:
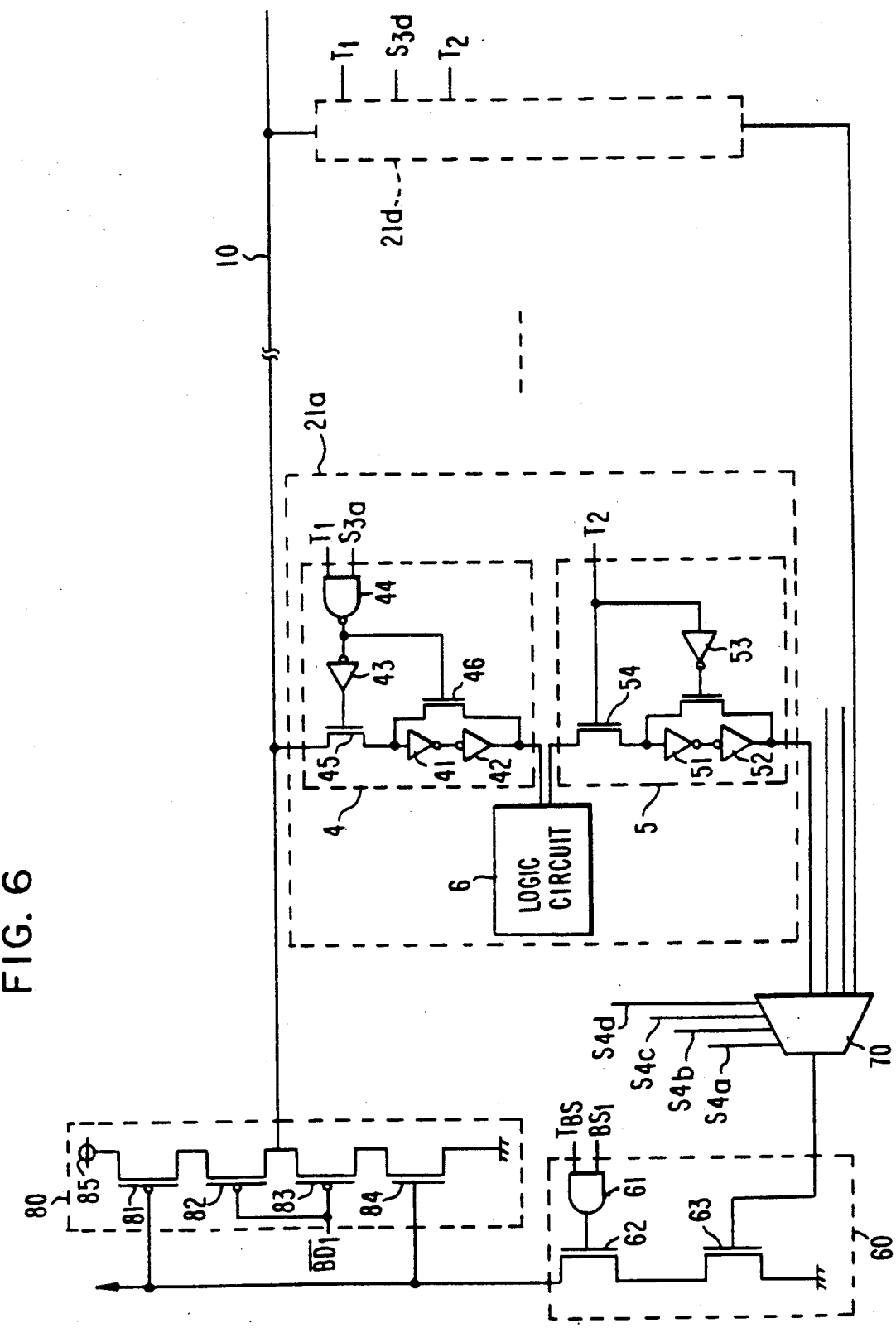
FIG. 6 is a circuit diagram showing a detailed structure of the main part of a bus circuit according to a third embodiment of the present invention.

FIG. 6 is a circuit diagram showing a detailed structure of the main part of a bus circuit, according to a third embodiment of the present invention.

According to thus embodiment, each local bus interconnection 10 has no precharging transistor 20 connected thereto. A transmitting circuit 80c comprises P-channel MOS transistors 81, 82 and 83, and an N-channel MOS transistor 84. The transistors 81, 82, 83 and 84 are connected in series between a power supply terminal 85 and a ground terminal. The gates of the transistors 81 84 are connected to the bus interconnection 1. The gates of the transistors 82 83 receive the block selecting signal $\overline{BD1}$.

When the block selecting signal $\overline{BD1}$ falls to the "L" level, the transistors 82 and 83 are turned on. When the data on the bus interconnection 1 represents the "H" level, the transistor 84 is turned on, discharging potential on the local bus interconnection 10 to the "L" level. (conversely, when the data on the bus interconnection 1 represents the "L" level, the transistor 81 is turned on, raising potential on the local bus interconnection 10 to the "H" level.

At this moment, the block selecting signal $\overline{BD2}$ to $\overline{BD4}$ applied to the transmitting circuits 80c in other blocks are all at the "H" level, the local bus interconnections 10 in those blocks are disconnected from the bus interconnection 1. Therefore, the local bus interconnections 10 in the unselected blocks are not charged nor discharged.

In this manner, according to the third embodiment of the present invention, the bus interconnection 1 serves as a precharge-type bus and each local bus interconnection 10 serves as a tri-state type bus. Accordingly, the precharging circuit for precharging the local bus interconnection 10 and a signal line for applying the precharging signal $\overline{T_{PC}}$ are not required. In addition, there is no need to allow for timings of precharging the local bus interconnections 10.

Meanwhile, structure and operation of other parts are the same as those in the first embodiment.

Figure 7:
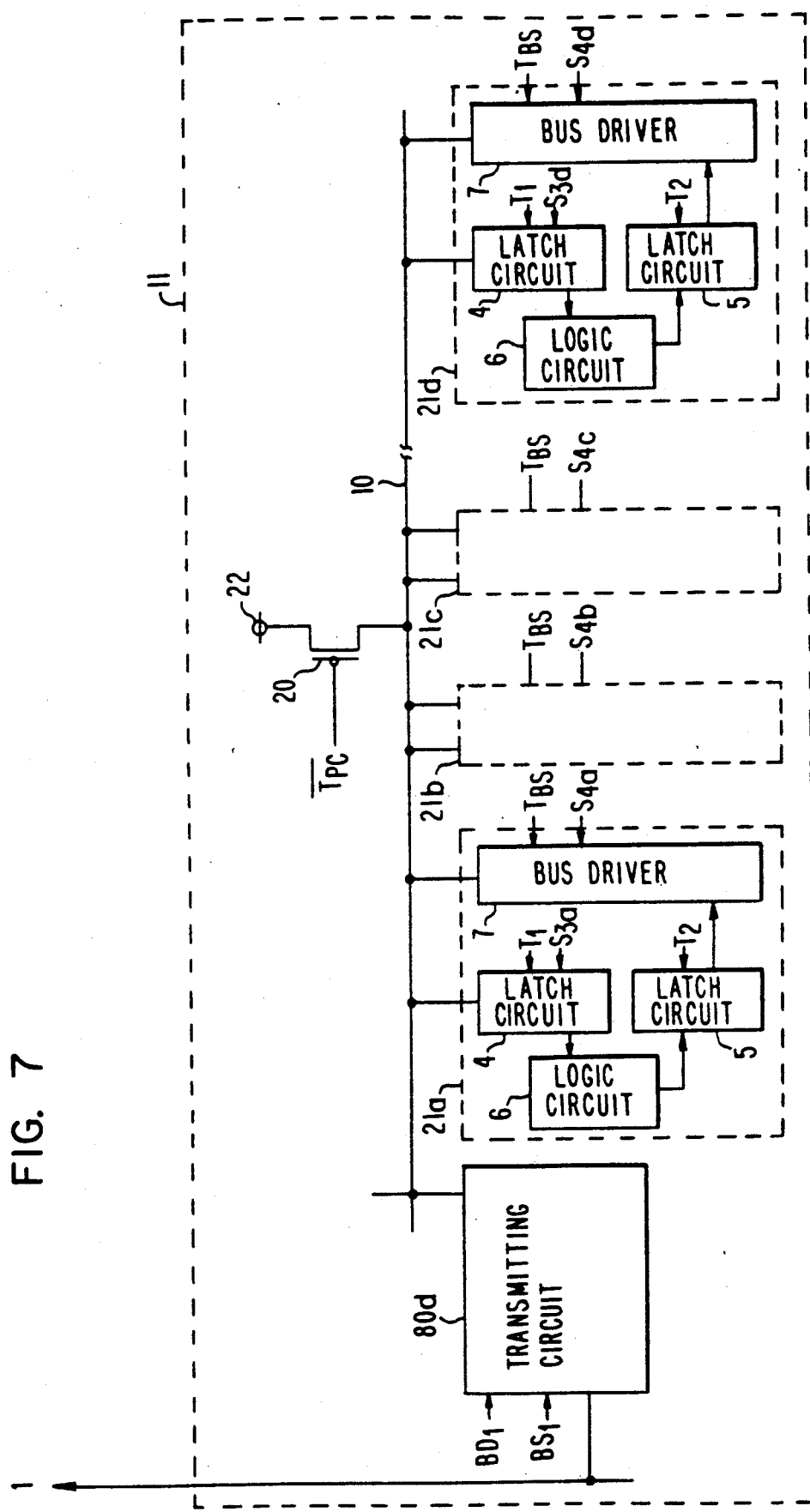
FIG. 7 is a diagram showing structure of the main part of a bus circuit according to a fourth embodiment of the present invention.
Figure 8:
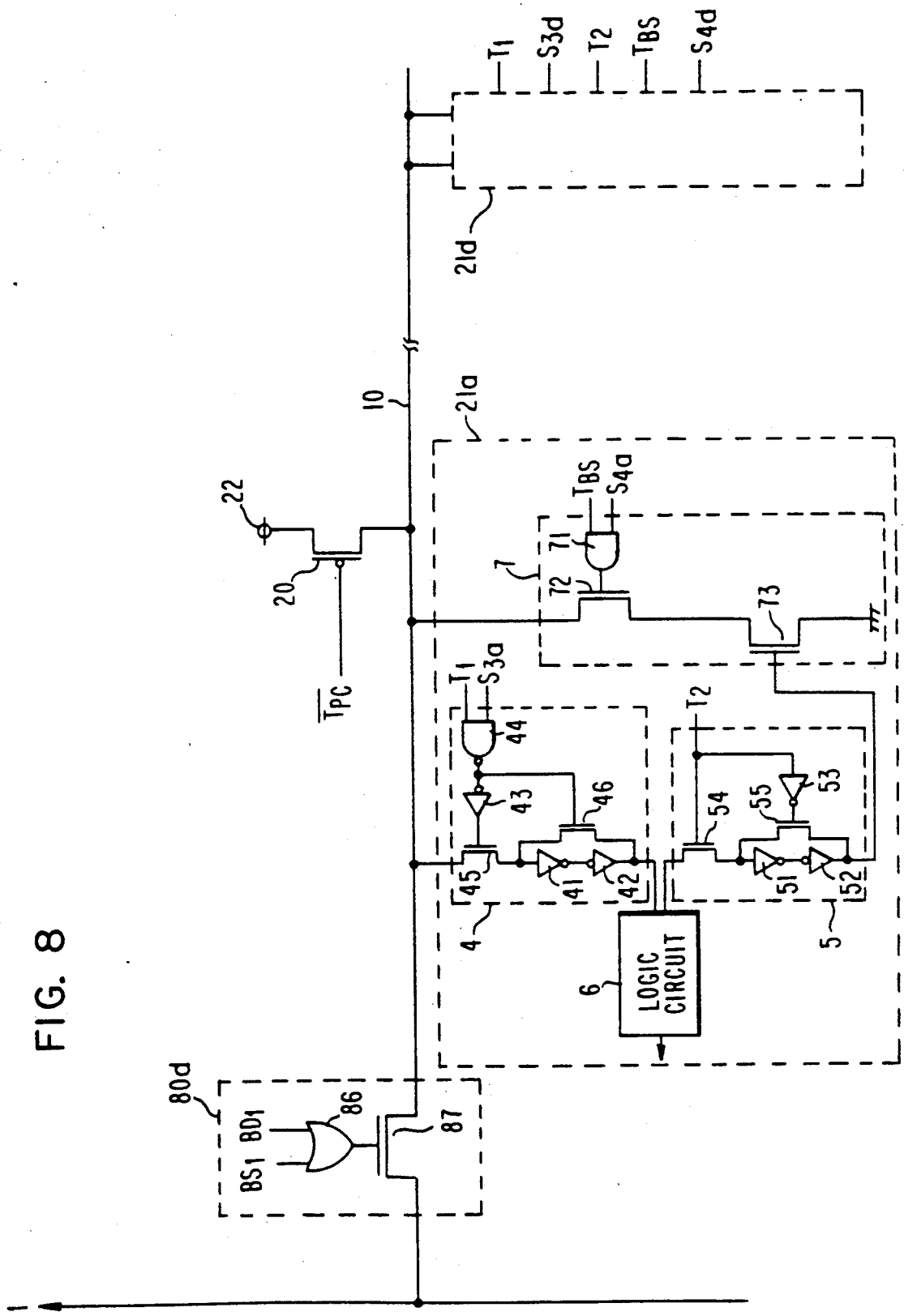
FIG. 8 is a circuit diagram showing a detailed structure of the main part of FIG. 7.

FIG. 7 is a diagram showing structure of one block in a precharged-type bus circuit according to a fourth embodiment of the present invention. FIG. 8 is a circuit diagram showing structure of the main part of FIG. 7 in detail.

Figure 13:
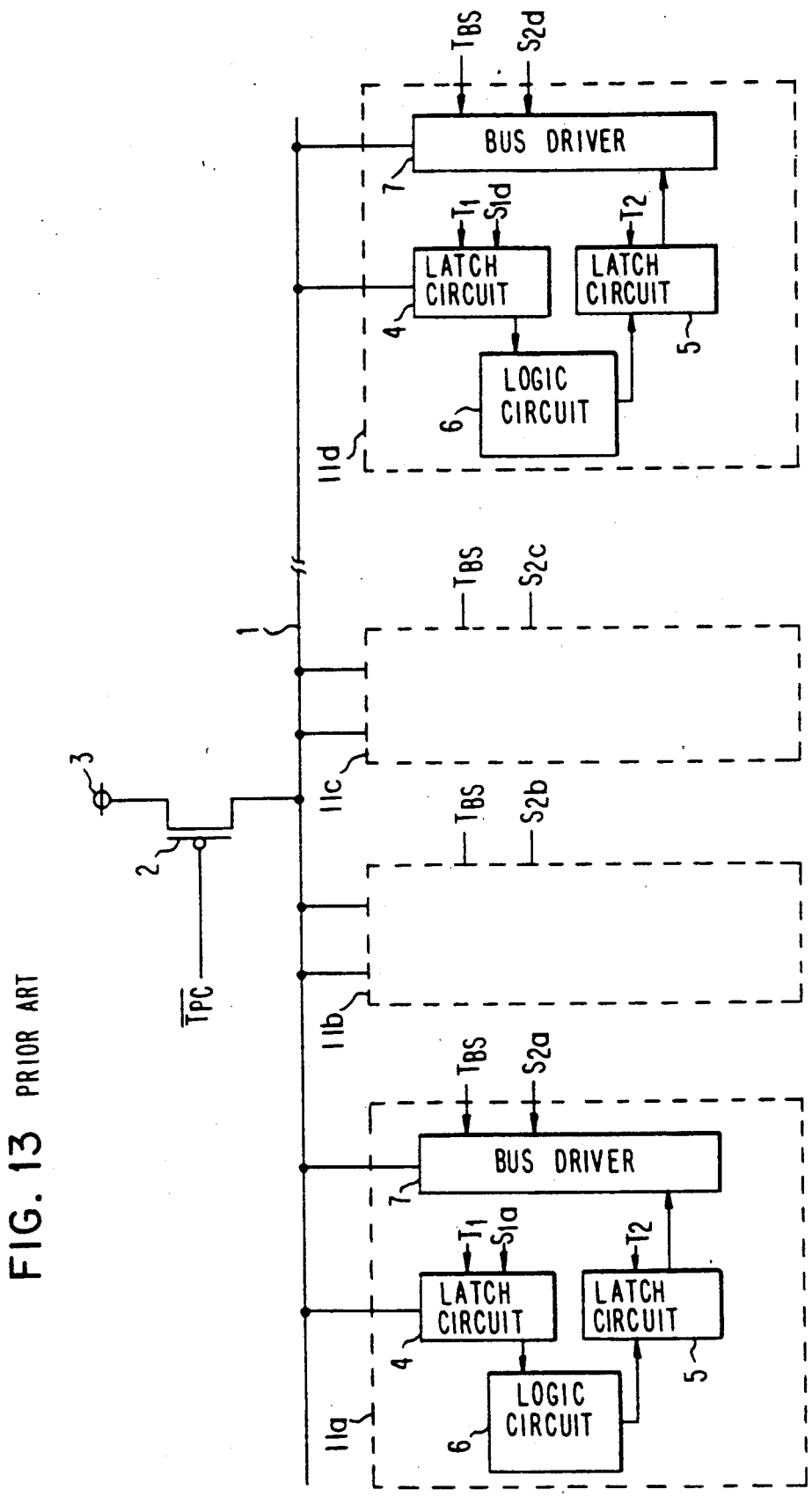
FIG. 13 is a diagram showing the entire structure of a conventional bus circuit.

As shown in FIG. 7, in the present embodiment, the bus driver 60 and the multiplexer 70 are not provided. Instead, each of the circuit blocks 21a to 21d has a bus driver 7 provided therein. The circuit blocks 21a to 21d are configured in the same manner as the circuit blocks 11a to 11d in FIG. 13.

The block selecting signal BS1 which is applied to the bus driver 60 in the embodiment shown in FIG. 1B is here applied to a transmitting circuit 80d, and the selecting signals S4a to S4d that are applied to the multiplexer 70 in the embodiment shown in FIG. 1B are here applied to the bus drivers 7 in the circuit blocks 21a to 21d, respectively.

In FIG. 8, the latch circuits 4 and 5 contained in the circuit block 21a and the bus driver 7 are configured in the same manner as the latch circuits 4 and 5, and the bus driver contained in the circuit block 11a of FIG. 14.

The transmitting circuit 80d comprises an OR gate 86 and a bidirectional N-channel MOS transistor 87. One input terminal of the OR gate 86 receives the block selecting signal BD1 and the other input terminal receives the block selecting signal BS1. The block selecting signal BD1 is an inverted signal of the block selecting signal $\overline{BD1}$.

Output of the OR gate 86 is applied to the gate of the transistor 87. The drain and the source of the transistor 87 are connected to the bus interconnection 1 and the local interconnection 10, respectively. Meanwhile, also the circuit blocks 21b to 21d are configured in the same manner as the circuit block 21a.

When either the block selecting signal BS1 or the block selecting signal BD1 attains the "H" level, the transistor 87 in the transmitting circuit 80d is turned on. This allows the local bus interconnection 10 to be connected to the bus interconnection 1. As a result, potential of the local bus interconnection 10 is determined according to the data on the bus interconnection 1, or otherwise, potential of the bus interconnection 1 is determined according to the data on the local bus interconnection 10. In this manner, bidirectional data transmission becomes possible between the bus interconnection 1 and the local bus interconnection 10.

In the bus circuit according to the present embodiment, the bus drivers 7 in those circuit blocks which have not been selected as source are not activated. Meanwhile, in those blocks which have not been selected as a source nor as destination, the transistors 87 are in the off-state. Therefore, the local bus interconnections 10 are disconnected from the bus interconnection 1. Accordingly, the local bus interconnections 10 in the unselected blocks are not discharged nor charged. As a result, any superfluous power consumption will be prevented.

In this manner, according to the fourth embodiment, the transmitting circuit is implemented as a bidirectional transistor, so that the circuit structure is simplified.

Meanwhile, structure and operation of other parts are the same as those in the first embodiment.

Figure 9:
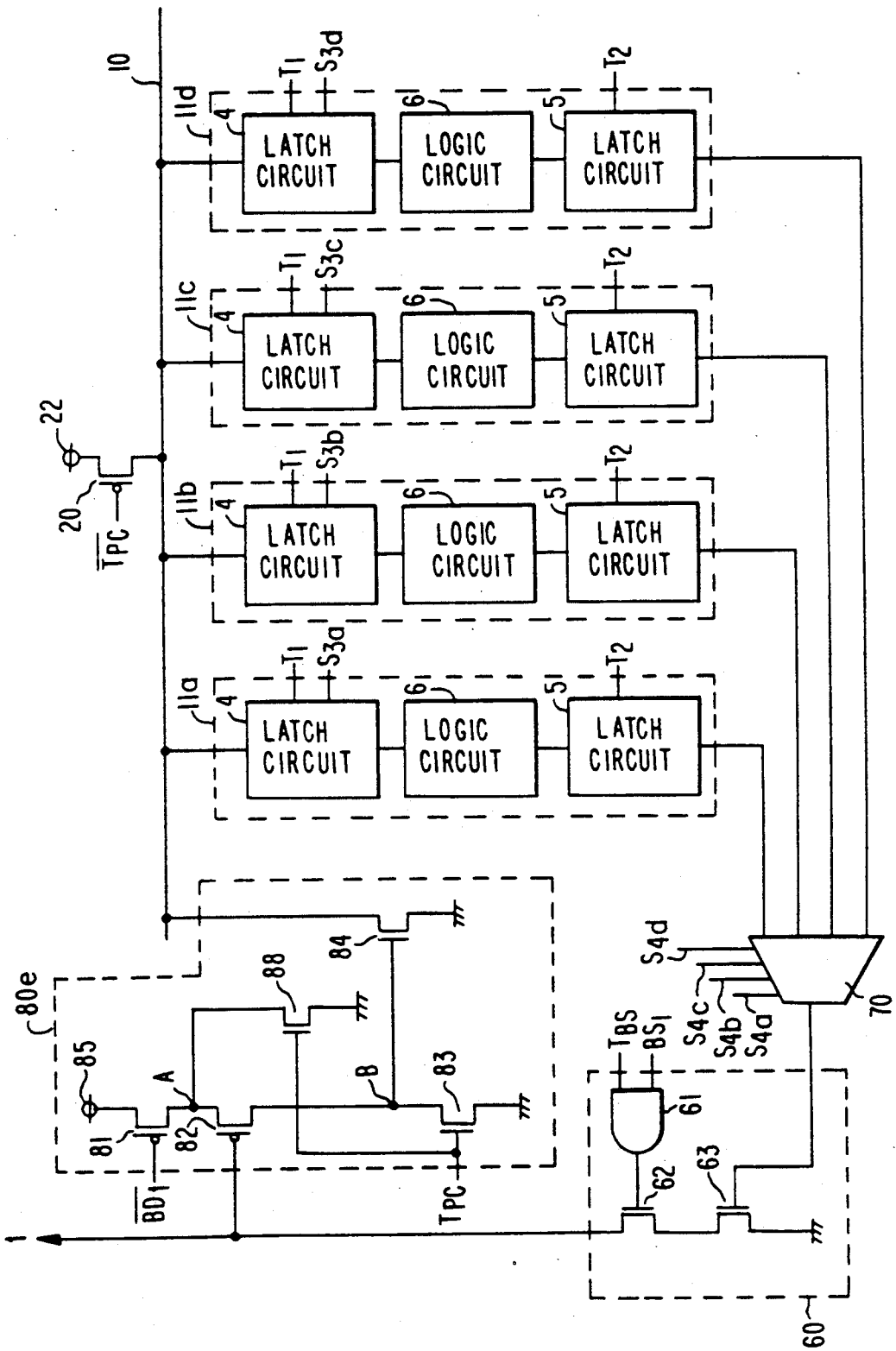
FIG. 9 is a circuit diagram showing a detailed structure of the main part of a bus circuit, according to a fifth embodiment of the present invention.

FIG. 9 is a diagram showing a detailed structure of the main part of a precharge-type bus circuit according to a fifth embodiment of the present invention.

In the embodiment, the transmitting circuit in FIG. 2 has been improved in the following points.

Referring to FIG. 2, since potential of the bus interconnection 1 unstably fluctuates between the "L" level and the "H" level according to the data transmitted therethrough, the transistor 82 of the transmitting circuit 80a is always either in the on-state or in the off-state, irrespective of whether the corresponding block has been selected or not. When the block shown in FIG. 2 is selected as a destination, the block selecting signal $\overline{BD1}$ falls to the "L" level, turning the transistor 81 off. If the potential of the bus interconnection 1 is at the "H" level, the transistor 82 is in the off-state, so that potential of the node A attains the "H" level.

If this block is not selected in the subsequent transfer cycle, the block selecting signal $\overline{BD1}$ attains the "H" level. At the time t1 (FIG. 3), the bus interconnection 1 has been precharged, so that the transistor 82 is in the off-state. Therefore, the potential at the node A is held at the "H" level. At this time, potential of another node B is discharged to the "L" level.

Now, if at the time t2, the potential on the bus interconnection 1 falls to the "L" level due to data transmission between other blocks, the transistor 82 is turned on. This causes redistribution of charges between the "H"-level node A and the "L"-level node B, resulting in current flow from the node A to the node B. This causes the transistor 84 to be turned on. As a result, the precharge local bus interconnection 10 is discharged to the "L" level.

As described above, according to the first embodiment, the local bus interconnections 10 in those blocks that have not been selected as a destination are discharged. This may lead to superfluous power consumption.

By contrast, in the fifth embodiment shown in FIG. 9, the transmitting circuit is configured such that the higher-rank bus 1 does not affect the unselected lower-rank buses 10.

In a transmitting circuit 80e of FIG. 9, an N-channel MOS transistor 88 is connected between the node A and the ground terminal. The gate of the transistor 88 receives a precharging signal $T_{PC}$.

If the precharging signal $\overline{T_{PC}}$ first falls to the "L" level and then the precharging signal Tpc attains the "H" level in a transfer cycle, the transistors 83 and 88 are turned on. This causes the nodes A and B to be discharged to the "L" level. Therefore, even if in a block which has not been selected as a destination, the potential of the bus interconnection 1 falls to the "L" level, turning the transistor 82 on, the redistribution of charges will not occur since the potentials of the nodes A and B are at the "L" level. This allows the gate potential of the transistor 84 to be held at the "L" level. Accordingly, the transistor 84 will never be turned on.

In this manner, according to the fifth embodiment, the local bus interconnections 10 in those blocks that have not been selected as a destination are not discharged. Accordingly, any superfluous power consumption will be prevented.

Meanwhile, structure and operation of other parts are the same as those in the first embodiment.

Figure 10:
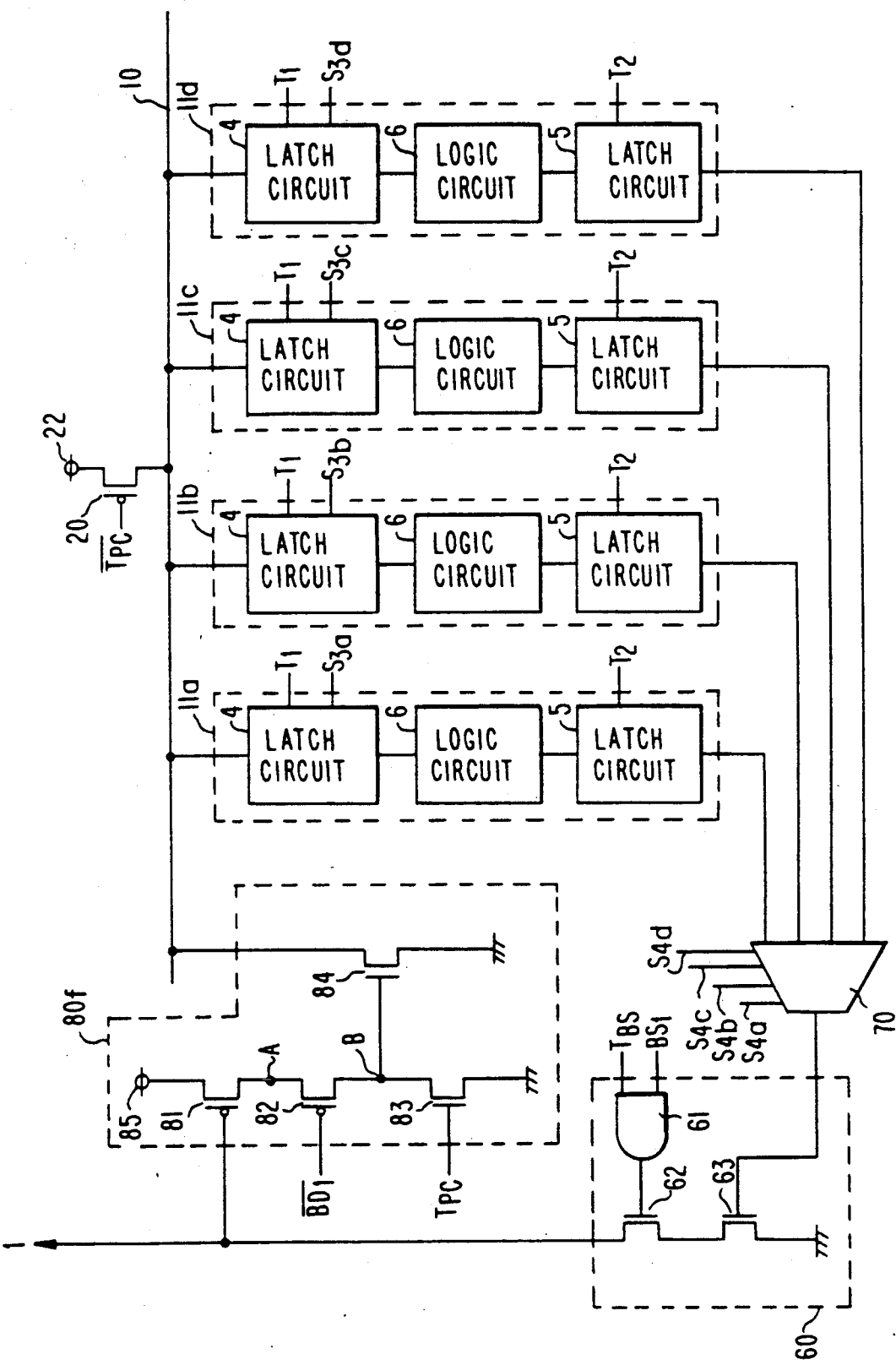
FIG. 10 is a circuit diagram showing a detailed structure of the main part of a bus circuit according to a sixth embodiment of the present invention.

FIG. 10 is a circuit diagram showing structure of the main part of a precharge-type bus circuit according to a sixth embodiment of the present invention.

Also in this embodiment, as in the fifth embodiment, the transmitting circuit has been improved.

When a transmitting circuit 80f in FIG. 10 is compared with the transmitting circuit 80a of FIG. 2, the gates of the transistors 81 and 82 are connected to different portions. In the transmitting circuit 80f of FIG. 10, the gate of the transistor 81 is connected to the bus interconnection 1 and the gate of the transistor 82 receives the block selecting signal $\overline{BD1}$.

When the block shown in FIG. 10 is not selected as a destination, the block selecting signal $\overline{BD1}$ is at "H" level. Therefore, the transistor 82 is in the off-state. Accordingly, even when the transistor 81 in the transmitting circuit 80f is turned on due to the "L" level-potential on the bus interconnection 1, the redistribution of charges of the node A will not occur since the transistor 82 is in the off-state. Thus, the gate potential of the transistor 84 is held at the "L" level without turning the transistor 84 on.

In this manner, according to the sixth embodiment, the local bus interconnections 10 are not discharged. Thus, superfluous power consumption in those blocks that have not been selected as a destination is prevented.

Meanwhile, structure and operation of other parts are the same as those in the first embodiment.

Figure 11:
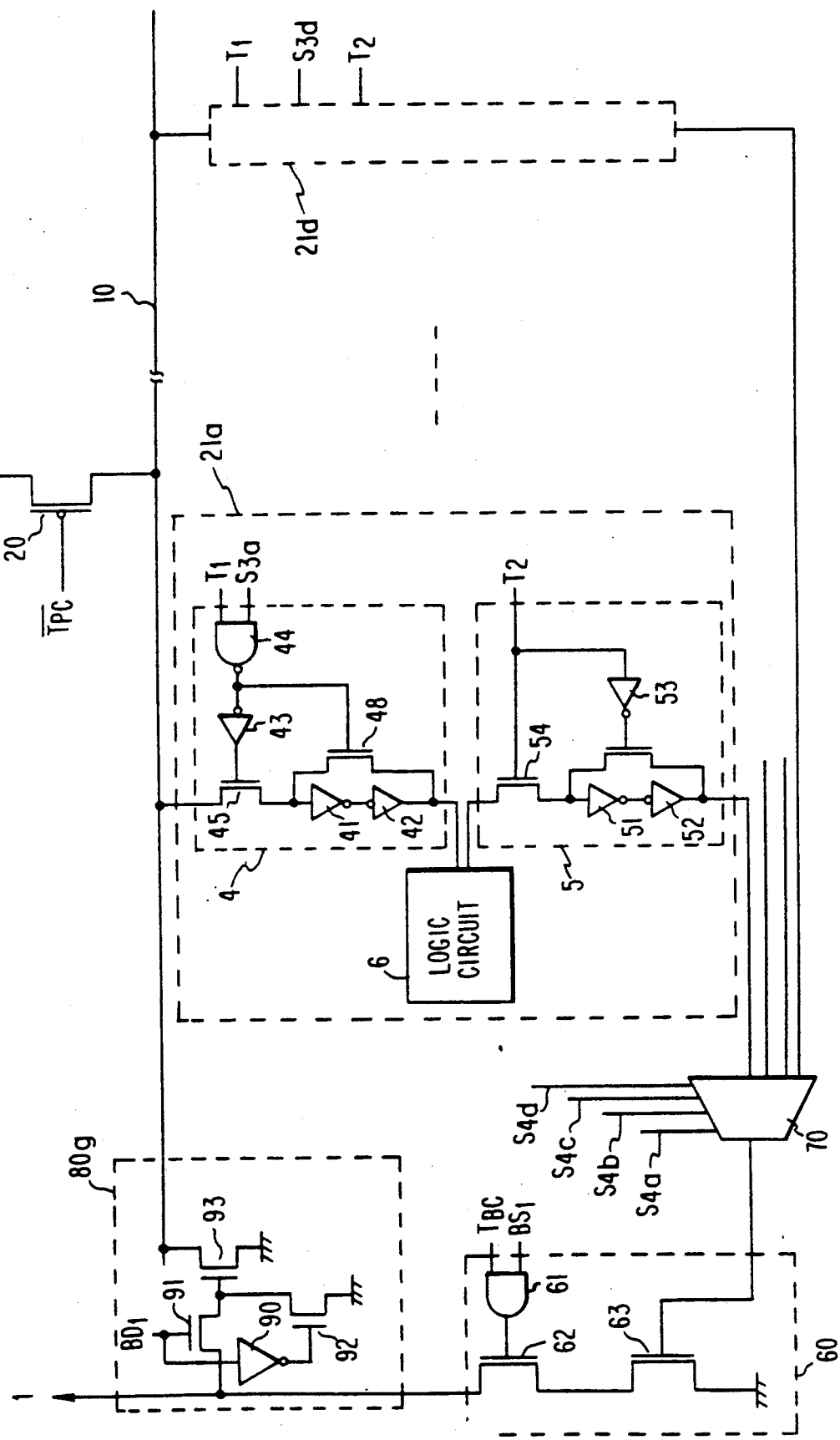
FIG. 11 is a circuit diagram showing a detailed structure of the main part of a bus circuit according to a seventh embodiment of the present invention.

FIG. 11 is a circuit diagram showing structure of the main part of a precharge-type bus circuit according to a seventh embodiment of the present invention.

In this embodiment, a transmitting circuit 80g is provided with a transmission gate. As shown in FIG. 11, the transmitting circuit 80g comprises an inverter 90 and N-channel MOS transistors 91, 92 and 93. The transistor 91 has its drain connected to the bus interconnection 1 and its source connected to the gate of the transistor 93. The transistor 92 has its drain connected to the gate of the transistor 93 and its source connected to ground. The transistor 93 has its drain connected to the local bus interconnection 10 and its source connected to ground. The gate of the transistor 91 receives the block selecting signal BD1 and the gate of the transistor 92 receives the block selecting signal $\overline{BD1}$ through the inverter 90. The block selecting signal $\overline{BD1}$ is an inverted signal of the block selecting signal $\overline{BD1}$.

When the block selecting signal BD1 attains the "H" level, the transistor 91 in the transmitting circuit 80g is turned on and the transistor 92 is turned off. Therefore, if the potential on the bus connection 1 is at the "H" level, the transistor 93 is turned on so that the potential on the local bus interconnection 10 falls to the "L" level. Conversely, if the potential on the bus interconnection 10 is at the "L" level, the transistor 93 is turned off, so that the potential on the local bus interconnection 10 is held at the "H" level.

At this moment, a "L"-level block selecting signal is applied to the transmitting circuit 80g in a block which has not been selected as a destination. This causes the transistor 91 to be turned off and the transistor 92 to be turned on. As a result, the transistor 93 is turned off, holding the potential on the local bus interconnection 10 at the "H" level.

In this manner, the local bus interconnection 10 in a blocks that have not been selected as a destination are not discharged, so that superfluous power consumption is prevented.

While in the transmitting circuits 80a to 80f in the first to sixth embodiments, the gate of a transistor are connected to the bus interconnection 1, in the transmitting circuit 80g in the seventh embodiment, the drain of a transistor is connected to the bus interconnection 1.

Generally, the source/drain capacitance is smaller than the gate capacitance in a transistor. In the seventh embodiment, therefore, capacitance of the bus interconnection 1 is reduced by implementing the transmitting circuit as a transmission gate. As a result, a lower consumption power for the bus circuit is achieved.

Further, with the transmission gate superior in high-speed switching operation, the bus interconnections can be discharged during a short time. Accordingly, it becomes possible for the bus circuit to transmit information at a higher speed.

Figure 12:
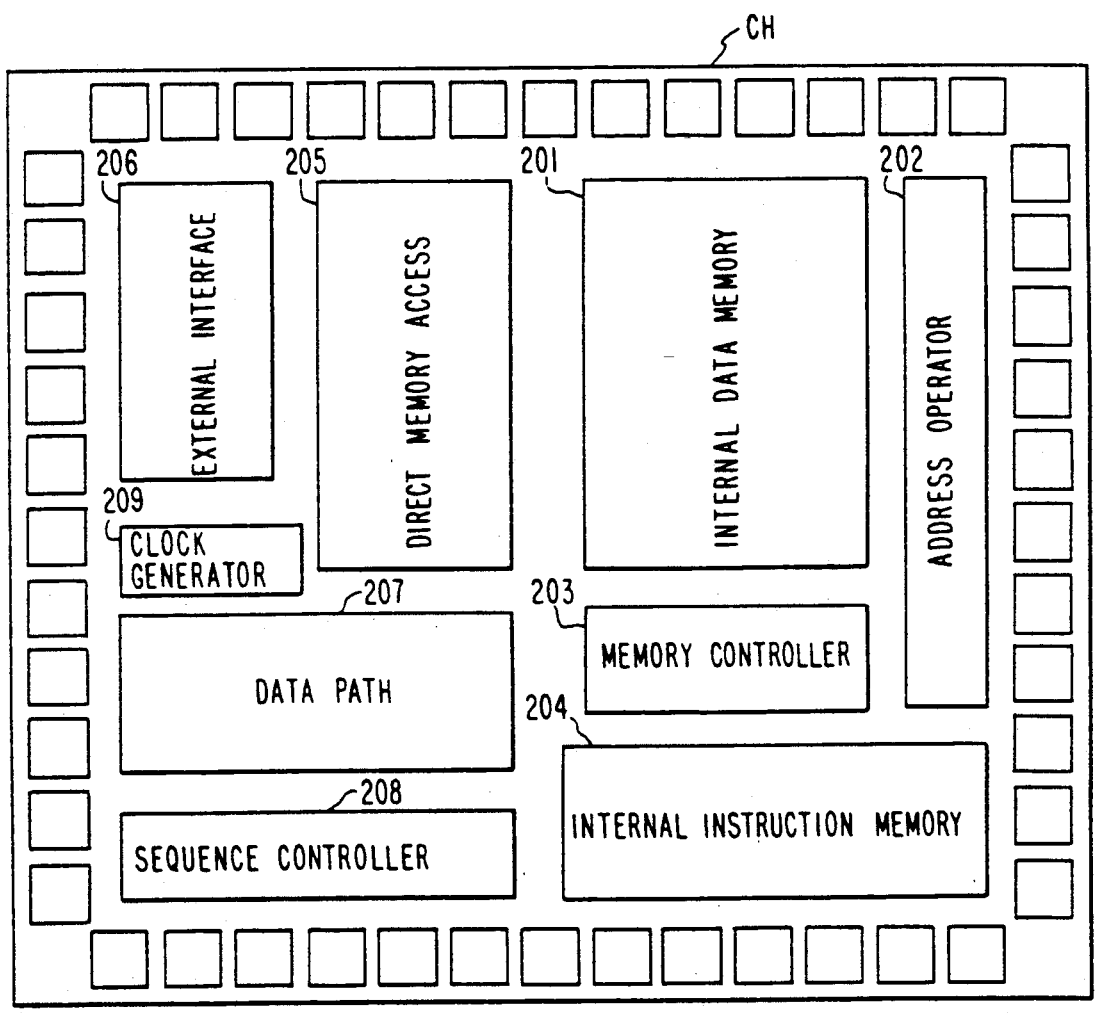
FIG. 12 is a block diagram showing structure of a one-chip microcomputer to which the present invention is applied.

The present invention can be applied, for example, to a one-chip microcomputer shown in FIG. 12.

In FIG. 12, on a chip CH, there are formed an internal data memory 201, an address operator 202, a memory controller 203, an internal instruction memory 204, a direct memory access 205, an external interface 206, a data path 207, a sequence controller 208 and a clock generator 209.

The respective blocks 201 to 208 other than the clock generator 209 correspond to the blocks 11 to 14 in the embodiments above, and a plurality of circuits in each of the blocks 201 to 208 correspond to the circuit blocks 21a to 21d. With the application of the present invention, it becomes possible to attain a one-chip microcomputer operating at a higher speed and with a lower consumption power.

Meanwhile, application of the present invention should not be limited only to such a one chip microcomputer, but is also possible for any other semiconductor integrated circuit devices.

While in the above-mentioned embodiments, a description has been made on a case where data are transmitted from a circuit block in one block to a circuit block in another block, the data can also be transmitted from one circuit block to another within the same block.

Further, while in the above mentioned embodiments, data are transmitted from one circuit block in one block to one circuit block in another block, the data can be transmitted from one circuit block in one block to a plurality of circuit blocks in nother block.

In this case, the NAND gate 44 in the latch circuit 4 and the selecting signals S3a to S3d are not necessary.

The functional means is not limited to a logic circuit performing logic operation, but may be implemented as any other circuit which performs various processings. Alternatively, the functional means may be implemented as a circuit or an interconnection which simply transmits output of the latch circuit 4 to the latch circuit 5 without performing any other processing.

As described in the foregoing, according to the present invention, bus capacitance is reduced since the buses are hierarchical constituted and thus the number of driving devices is reduced. Consequently, the transmitting time of information is shortened and also the consumption power is reduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is

1. A bus circuit formed on one chip for transmitting information between a plurality of functional portions, comprising:
    a hierarchical bus including a higher-rank bus and a plurality of lower-rank buses,
    each of said plurality of lower-rank buses being coupled with a plurality of functional portions;
    switching means for establishing a continuous data communications circuit from one of the lower-rank buses to another of the lower-rank buses, the communications circuit comprising a first path from the one lower-rank bus to the higher-rank bus and a second path, established simultaneously with the first path, from the higher-ranked bus to the other of the lower-rank buses; and
    a plurality of transmitting means each for transmitting information between one of said functional portions on said one lower-rank bus to another of said functional portions on said another of said lower-ranked buses over said data communications circuit.

2. The bus circuit according to claim 1, further comprising:
    first precharge means for precharging said higher-rank bus to a predetermined potential; and
    a plurality of second precharge means provided corresponding to said plurality of lower-rank buses for precharging the corresponding lower-rank buses to a predetermined potential.

3. A bus circuit formed on one chip for transmitting information between a plurality of functional portions, comprising:
    a hierarchical bus including a higher-rank bus and a plurality of lower high-rank buses,
    each of said plurality of lower-rank buses being coupled with a plurality of functional portions; and a plurality of transmitting means each for transmitting information between said higher-rank bus and one of said plurality of lower-rank buses;
    first precharge means for precharging said higher-rank bus to a predetermined potential; and
    a plurality of second precharge means provided corresponding to said plurality of lower-rank buses for precharging the corresponding lower-rank buses to a predetermined potential,
    wherein each of said plurality of transmitting means includes
        (i) multiplex means for selecting any of the corresponding plurality of functional portions,
        (ii) driver means for holding potential of said higher-rank bus or discharging said higher-rank bus according to output of the functional portion selected by said multiplex means, and
        (iii) transmitting means for holding potential of the corresponding lower-rank bus or discharging said corresponding lower-rank bus according to the potential of said higher-rank bus.

4. The bus circuit according to claim 3, further comprising:
    first selecting signal generating means for generating a first selecting signal for selecting to activate any of said plurality of driver means; and
    second selecting signal generating means for generating a second selecting signal for selecting to activate any of said plurality of transmitting means.

5. The bus circuit according to claim 4, wherein each of said plurality of transmitting means comprises:
    first switch means for discharging the corresponding lower-rank bus; and
    second switch means responsive to the potential of said higher-rank bus and said second selecting signal for making said first switch means conductive or non-conductive.

6. The bus circuit according to claim 4, wherein each of said plurality of transmitting means further comprises:
    means for preventing said higher-rank bus from affecting the corresponding lower-rank bus in the unselected state.

7. The bus circuit according to claim 4, wherein each of said plurality of transmitting means comprising:
    a first and a second transistors coupled in series between a predetermined first potential and a predetermined node; and
    a third transistor coupled between the corresponding lower-rank bus and a predetermined second potential and having its gate connected to said predetermined node,
    said first transistor having a gate for receiving said first select signal, and a second transistor having a gate connected to said higher-rank bus.

8. The bus circuit according to claim 4, wherein each of said plurality of transmitting means comprises:
    a first, a second and a third transistors coupled in series between a first and a second predetermined potentials through a first and a second nodes;
    a fourth transistor coupled between the corresponding lower-rank bus and said second potential; and
    a fifth transistor coupled between said first node and said second potential,
    said first transistor having a gate for receiving said second selecting signal, and second transistor having a gate connected to said higher-rank bus, said fourth transistor having a gate connected to said second node, and said third and fifth transistors being rendered conductive on the occasion of precharging.

9. The bus circuit according to claim 4, wherein each of said plurality of transmitting means comprises:

a first, a second and a third transistors coupled in series between a first and second predetermined potentials through a first and a second nodes; and a fourth transistor coupled between the corresponding lower-rank bus and said second potential, said first transistor having a gate connected to said higher-rank bus, said second transistor having a gate for receiving said second selecting signal, said fourth transistor having a gate connected to said second node, and said third transistor being rendered conductive on the occasion of precharging.

10. The bus circuit according to claim 4, wherein each of said plurality of transmitting means, comprises:

a first transistor connected between said higher-rank bus a predetermined node;

a second transistor coupled between the corresponding lower-rank bus and a predetermined second potential; and a third transistor coupled between said node and said second potential, said first transistor having a gate for receiving said second selecting signal, said second transistor having a gate connected to said node, and said third transistor being rendered conductive on the occasion of precharging.

11. The bus circuit according to claim 2, wherein said first precharge means comprises an MOS transistor, and each of said plurality of second precharge means comprises an MOS transistor.

12. The bus circuit according to claim 2, wherein each of said plurality of transmitting means comprises:

transmitting means coupled between the corresponding lower-rank bus and said higher-rank bus and rendered conductive or non-conductive.

13. The bus circuit according to claim 12, further comprising:

first select signal generating means for generating a first selecting signal for selecting activate any of said plurality of transmitting means; and second selecting signal generating means for generating a second selecting signal for selecting to activate of any of said plurality of transmitting means.

14. The bus circuit according to claim 13, wherein each of said plurality of transmitting means comprises:

transmission gate means connected between the corresponding lower-rank bus and said higher-rank bus for being rendered conductive or non-conductive in response to said first or second selecting signal.

15. A bus circuit formed on one chip for transmitting information between a plurality of functional portions, comprising:

a hierarchical bus including a higher-rank bus and a plurality of lower-rank buses, each of said plurality of lower-rank buses being coupled with a plurality of functional portions;

precharge means for precharging at least said higher-rank bus or any of said plurality of lower-rank buses to a predetermined potential;

switching means for establishing a continuous data communications circuit from one of the lower-rank buses to another of the lower-rank buses, the communications circuit comprises a first path from the one lower-rank bus to the higher-ranked bus and a second path, established simultaneously with the first path, from the higher-ranked bus to the other of the lower-rank buses; and a plurality of transmitting means each for transmitting information between one of said functional portions on said one lower-rank bus to another of said functional portions on said another of said lower-ranked buses over said data communications circuit.

16. A bus circuit formed on a chip for transmitting information between a plurality or functional portions, comprising:

a hierarchical bus including a higher-rank bus and a plurality of lower-rank buses, each of said plurality of lower-rank buses being coupled with a plurality of functional portions;

precharge means for precharging at least said higher-rank bus or any of said plurality of lower-rank buses to a predetermined potential; and level shift means for shifting the potential to be precharged by said precharging means by a predetermined voltage; and a plurality of transmitting means each for transmitting information between said higher-rank bus and one of said plurality of lower-rank buses.

17. The bus circuit according to claim 16, wherein each of said plurality of transmitting, means comprises:

multiplex means for selecting any of the corresponding plurality of functional portions;

driver means for holding potential of said higher-rank bus or discharging said higher-rank bus according to output of the functional portion selected by said multiplex means; and transmitting means for holding potential of the corresponding lower-rank buses or discharging said corresponding lower-rank buses according to the potential of said higher-rank bus.

18. The bus circuit according to claim 17, further comprising:

first selecting signal generating means for generating a first selecting signal for selecting to activate any of said plurality of driver means; and second selecting signal generating means for generating a second selecting signal for selecting to activate any of said plurality of transmitting means.

19. The bus circuit according to claim 18, wherein said level shifting means comprises:

at least one MOS transistor connected between a predetermined potential and said first precharge means.

20. The bus circuit according to claim 19, wherein each of said plurality of transmitting means comprises:

first switch means connected between a first node and a predetermined second node and responsive to said second selecting signal and the potential of said higher-rank bus for being rendered conductive or non-conductive;

second switch means coupled between said second node and a second potential for being rendered conductive on the occasion of precharging;

third switch means coupled between the corresponding lower-rank bus and said second potential and having a gate connected to said second node; and level shift means coupled between said predetermined potential and said first node for shifting said predetermined potential by a predetermined voltage.

21. The bus circuit formed on one chip for transmitting information between a plurality of functional portions, comprising:

a hierarchical bus including a higher-rank bus and a plurality of lower-rank buses, each of said plurality of lower-rank buses being coupled with a plurality of functional portions;

precharge means for precharging said higher-rank bus to a predetermined potential;

a plurality of tri-state driving means each for driving one of the lower-rank buses to any of a first predetermined potential, a second predetermined potential and the floating state, in response to a signal on said higher-rank bus; and a plurality of driver means provided corresponding to said plurality of lower-rank buses each for driving said higher-rank bus according to output of the corresponding functional portions.

22. The bus circuit according to claim 21, further comprising:

first selecting signal generating means for generating a first selecting signal for selecting to selects and activate any of said plurality of driver means; and second selecting signal generating means for generating a second select signal for selecting to activate any of said plurality of tri-state driving means.

23. The bus circuit according to claim 22, wherein each of said plurality of tri-state driving means comprises:

a first, a second and third switch means coupled in series between said first potential and said second potential, said second switch means is rendered conductive in response to said second selecting signal, and either said first switch means or said third switch means is selectively rendered conductive according to information from said higher-rank bus.

24. A bus circuit formed on one chip for transmitting information between a plurality of functional portions, comprising:

a hierarchical bus including a higher-rank bus and a plurality of lower-rank buses, each of said plurality of lower-rank buses being coupled with a plurality of functional portions;

a plurality of multiplex means provided corresponding to said plurality of lower-rank buses each for selecting output of any of the corresponding plurality of functional portions;

a plurality of driver means provided corresponding to said plurality of lower-rank buses each for driving said higher-rank bus according to the output of the functional portion selected by the corresponding multiplex means; and a plurality of transmitting means provided corresponding to said plurality of lower-rank buses each for driving the corresponding lower-rank bus in response to an information signal on said higher-rank bus.

25. An operating method for a bus circuit which comprises hierarchical buses including a higher-rank bus an a plurality of lower-rank buses, each of said plurality of lower-rank buses being connected to a plurality of functional portions, comprising the following steps of:

selecting any of said plurality of functional portions and driving said higher-rank bus based on output of the selected functional portion; and simultaneously selecting any of said plurality of said lower-rank buses, transmitting information on said higher-rank bus to the selected lower-rank bus and disconnecting the other lower-rank buses that have not been selected from said higher-rank bus.

26. A semiconductor integrated circuit including a decoder means including means for providing one source register block select signal, one destination block select signal, one source register select signal and one register select signal, a higher rank bus, at least two lower rank buses connected to said higher rank bus through a first switching means responsive to at least one of said source register block select signal and said destination register block select signal, at least two registers connected to each said lower rank bus through a second switching means responsive to at least one of said source register select signal and said destination register select signal, and precharge means for precharging at least said higher rank bus.

27. A semiconductor integrated circuit including a higher rank bus including means for precharging said higher rank bus prior to transfer of data between registers of said bus circuit, said bus circuit including a plurality of register blocks connected to said higher rank bus, each said register block including a lower rank bus including means for precharging said lower rank bus prior to transfer of data in said bus circuit, said lower rank bus circuit being connected to said higher rank bus through a lower rank bus connection means, said lower rank bus connection means being responsive to a destination register block address, a register output selection means, responsive to a source register select signal, for selectively providing an output to said higher rank bus, connected to said higher rank bus through a gate responsive to a source register block select signal, and a plurality of registers each having an input selector, responsive to a destination register select signal, connected to said lower rank bus and an output connected to said multiplexer, and a decoder means for providing one source register block select signal, one destination register block select signal, one source register select signal and one destination register select signal for each transfer, a precharge means for providing a precharge voltage to at least one of said higher rank bus and said lower rank bus.

28. A semiconductor integrated circuit on a single substrate including a higher rank bus and a plurality of lower rank buses including: precharge means for said higher rank bus and said plurality of lower rank buses; decoder means including means for providing one source register block select signal, one destination block select signal, one source register select signal and one register select signal; and control means responsive to said decoder means for selectively controlling transfer between said higher rank bus and one of said lower rank buses.

29. A semiconductor integrated circuit as recited in claim 26, wherein said precharging means includes at least one voltage reducing means including at least one diode-connected field effect transistor.

30. A semiconductor integrated circuit as recited in claim 26, wherein said precharging means includes a voltage reducing means connected to each of said higher rank bus and said lower rank buses.

31. A semiconductor integrated circuit as recited in claim 26, wherein
said means for precharging said lower rank bus comprises a circuit enabled by said destination register block signal and responsive to a signal on said higher rank bus for charging and discharging said lower rank bus.

32. A semiconductor integrated circuit as recited in claim 26, wherein
said register output selection means comprises an output transfer gate in at least one said register.

33. A semiconductor integrated circuit as recited in claim 26, wherein
said lower rank bus connection means comprises a bidirectional switch responsive to at least one of said source register block select signal and said destination register block select signal.

34. A semiconductor integrated circuit as recited in claim 26, further including means for discharging a parasitic capacitance of a node of said lower rank bus connecting said first switching means in response to a precharge initiating signal.

35. A semiconductor integrated circuit as recited in claim 26 wherein
said lower rank bus connecting first switching means includes further switching means responsive to signals on said higher rank bus connected in series for connecting a source of precharge voltage to a node;
said lower rank bus connecting said first switching means including means responsive to said destination block select signal for connecting said node to a means for discharging said lower rank bus.

36. A semiconductor integrated circuit as recited in claim 26 further including
a selective input circuit responsive to said destination block select signal including
a first transistor having conduction terminals connected between one of said lower rank buses and a gate electrode, and
a second transistor having conduction terminals connected between said gate electrode of said first transistor and said higher rank bus.

37. A data transfer method for effecting transfer of data between ones of a plurality of functional portions of a circuit formed on a single semiconductor substrate including at least one higher rank bus and at least two lower rank buses, said functional portions being selectively connected to one of said at least two lower rank buses, said method including the steps of
a) selecting one said functional portion connected to each of said lower rank buses for each of a source and destination of said data transfer,
b) selecting one of said at least two lower rank buses for each of a source and destination of said data transfer and
c) selectively connecting an input of one said functional portion and an output of another functional portion to said higher rank bus in response to steps a) and b).

38. A method as recited in claim 25, wherein said step of selecting any of said plurality of functional portions includes the step of selectively connecting said output from said plurality of functional portions (21a to 21d) to said higher-rank bus (1).

39. A method as recited in claim 25, further comprising the step of precharging said higher-rank bus and said selected lower-rank buses.

40. A semiconductor integrated circuit as recited in claim 28, further comprising:
first switching means for selectively connecting said higher-rank bus to said lower rank buses responsive to at least one of said source register block select signal and said destination register block select signal, and
at least two registers connected to each said lower rank bus through a second switching means responsive to at least one of said source register select signal and said destination register select signal.

41. A method as recited in claim 37, further comprising the step of precharging said higher-rank bus and said selected lower-rank buses.

42. A bus circuit formed on one chip for transmitting information between a plurality of functional portions, comprising:
a hierarchical bus including a higher-rank bus and a plurality of lower-rank buses,
each of said plurality of lower-rank buses being coupled with a plurality of functional portions;
multiplex means for connecting an output of any of the plurality of functional portions to said higher-rank bus; and
a plurality of transmitting means each establishing a continuous data communications circuit for transmitting information between one of said functional portions on one of said plurality of lower-rank buses to another of said functional portions on another of said plurality of lower-rank buses over said higher-rank bus.

43. A bus circuit formed on one chip for transmitting information between a plurality of functional portions, comprising:
a hierarchical bus including a higher-rank bus and a plurality of lower-rank buses,
each of said plurality of lower-rank buses being coupled with a plurality of functional portions;
precharge means for precharging at least said higher-rank bus or any of said plurality of lower-rank buses to a predetermined potential;
multiplex means for connecting an output of any of the plurality of functional portions to said higher-rank bus; and
a plurality of transmitting means each for transmitting information between one of said functional portions on said one lower-rank bus to another of said functional portions on said another of said lower-ranked buses over said data communications circuit.

* * * * *